(12) United States Patent
Kothari et al.

(10) Patent No.: US 11,228,566 B1
(45) Date of Patent: Jan. 18, 2022

(54) SYSTEM AND METHOD TO ANONYMIZE DATA TRANSMITTED TO A DESTINATION COMPUTING DEVICE

(71) Applicant: Ciphercloud, Inc., San Jose, CA (US)

(72) Inventors: Pravin Kothari, San Jose, CA (US); Debabrata Dash, San Jose, CA (US)

(73) Assignee: Ciphercloud, Inc., San Jose, CA (US)

( * ) Notice: Subject to any disclaimer, the term of this patent is extended or adjusted under 35 U.S.C. 154(b) by 2580 days.

(21) Appl. No.: 13/929,784

(22) Filed: Jun. 28, 2013

Related U.S. Application Data

(63) Continuation-in-part of application No. 13/844,509, filed on Mar. 15, 2013, now Pat. No. 9,356,993, which is a continuation-in-part of application No. 13/042,459, filed on Mar. 8, 2011, now Pat. No. 8,694,646, and a continuation-in-part of application No. 13/323,821, filed on Dec. 13, 2011, now Pat. No. 8,726,398.

(51) Int. Cl.
*H04L 29/06* (2006.01)

(52) U.S. Cl.
CPC .................. *H04L 63/0421* (2013.01)

(58) Field of Classification Search
CPC ............ H04L 63/0421; H04L 63/1483; G06F 21/6254; G06F 21/62; G06F 21/6227; G06F 21/6245
USPC ........................................................ 726/30
See application file for complete search history.

(56) References Cited

U.S. PATENT DOCUMENTS

| | | | |
|---|---|---|---|
| 5,412,384 A | | 5/1995 | Chang et al. |
| 5,603,025 A | * | 2/1997 | Tabb ....................... G06F 16/94 |
| 5,978,791 A | | 11/1999 | Farber et al. |
| 6,941,511 B1 | | 9/2005 | Hind et al. |
| 7,165,175 B1 | | 1/2007 | Kollmyer |
| 7,191,344 B2 | | 3/2007 | Lin et al. |
| 7,225,161 B2 | | 5/2007 | Lam et al. |
| 7,376,831 B2 | | 5/2008 | Kollmyer et al. |
| 7,564,997 B2 | | 7/2009 | Hamid |
| 7,596,222 B2 | | 9/2009 | Jonas et al. |
| 7,603,322 B2 | | 10/2009 | Lam et al. |
| 7,751,334 B2 | | 7/2010 | Varadarajan et al. |
| 7,864,952 B2 | | 1/2011 | Pauker et al. |

(Continued)

FOREIGN PATENT DOCUMENTS

WO 2011043646 A1 4/2011

*Primary Examiner* — Longbit Chai
(74) *Attorney, Agent, or Firm* — Minisandram Law Firm; Raghunath S. Minisandram

(57) ABSTRACT

A method and system for anonymizing data to be transmitted to a destination computing device is disclosed. Anonymization strategy for data anonymization is provided. Data to be transmitted is received from a user computer. Selective anonymization of the data is performed, based on the anonymization strategy, using an anonymization module. The data includes a plurality of characters. An order indicator data indicative of the order of the received data is generated. The received data is anonymized to derive an anonymized data. The anonymized data and the order indicator data is transmitted to the destination computer over a network. In one embodiment, a portion of the anonymized data is selected as a search ID. A cross reference between a search key indicative of a portion of the received data and the corresponding search ID is stored.

16 Claims, 19 Drawing Sheets

(56) References Cited

U.S. PATENT DOCUMENTS

| | | |
|---|---|---|
| 7,974,221 B2 | 7/2011 | Tamassia et al. |
| 8,005,227 B1 | 8/2011 | Linnell et al. |
| 8,024,339 B2 | 9/2011 | Barker et al. |
| 8,275,850 B2 | 9/2012 | Kohan et al. |
| 8,301,787 B2 | 10/2012 | Li |
| 8,661,423 B2 | 2/2014 | Agrawal et al. |
| 8,751,827 B1 | 6/2014 | Duane et al. |
| 2002/0120573 A1 | 8/2002 | McCormick |
| 2002/0141575 A1 | 10/2002 | Hird |
| 2003/0016821 A1 | 1/2003 | Hammersmith |
| 2003/0204513 A1 | 10/2003 | Bumbulis |
| 2005/0041955 A1 | 2/2005 | Beuque et al. |
| 2006/0004747 A1 | 1/2006 | Weare |
| 2006/0129545 A1 | 6/2006 | Golle et al. |
| 2006/0168609 A1 | 7/2006 | Chen |
| 2006/0294136 A1 | 12/2006 | Wu |
| 2007/0043730 A1 | 2/2007 | Wisely |
| 2007/0101123 A1 | 5/2007 | Kollmyer et al. |
| 2007/0116285 A1* | 5/2007 | Nakai .................. H04L 9/0891 380/255 |
| 2007/0130084 A1 | 6/2007 | Kay et al. |
| 2007/0189541 A1 | 8/2007 | Lam et al. |
| 2007/0239705 A1 | 10/2007 | Hunt et al. |
| 2008/0082834 A1 | 4/2008 | Mattsson |
| 2008/0148407 A1 | 6/2008 | Katkar |
| 2008/0152144 A1 | 6/2008 | Douguet |
| 2008/0162432 A1 | 7/2008 | Wang |
| 2008/0250056 A1 | 10/2008 | Au et al. |
| 2009/0024565 A1 | 1/2009 | Wong |
| 2009/0064335 A1 | 3/2009 | Sinn et al. |
| 2009/0282036 A1 | 11/2009 | Fedtke |
| 2009/0327434 A1 | 12/2009 | Reynolds |
| 2010/0036835 A1 | 2/2010 | Stergiou et al. |
| 2010/0036959 A1 | 2/2010 | Trace et al. |
| 2010/0058072 A1 | 3/2010 | Teow et al. |
| 2010/0058073 A1 | 3/2010 | Ng et al. |
| 2010/0082626 A1 | 4/2010 | Tsai et al. |
| 2010/0094758 A1 | 4/2010 | Chamberlain |
| 2010/0138415 A1 | 6/2010 | Lein |
| 2011/0080462 A1 | 4/2011 | Yamaji et al. |
| 2011/0167221 A1 | 7/2011 | Pangal et al. |
| 2011/0201314 A1 | 8/2011 | Marsico |
| 2011/0202755 A1 | 8/2011 | Orsini et al. |
| 2011/0246298 A1 | 10/2011 | Williams et al. |
| 2012/0130983 A1 | 5/2012 | Ryan et al. |
| 2012/0239770 A1 | 9/2012 | Noldus et al. |
| 2013/0275532 A1 | 10/2013 | Shah et al. |
| 2014/0006457 A1 | 1/2014 | Ninomiya et al. |
| 2014/0108813 A1 | 4/2014 | Pauker et al. |
| 2014/0123304 A1 | 5/2014 | Rachlin et al. |

\* cited by examiner

| APP- SA0 | TYPE | LENGTH | RETAIN | ANON STRATEGY |
|---|---|---|---|---|
| DATA FIELD 1 | NUMERIC | 10 | 10:08 | TPF1 |
| DATA FIELD 2 | ALPHA | 24 | None | TPF2 |
| DATA FIELD 3 | ALP-NUM | 40 | None | TPF1 |
| DATA FIELD 4 | ALPHA | 8 | None | TPF4 |
| DATA FIELD 5 | ALPHA | 32 | None | TPF5 |
| DATA FIELD 6 | ALP-NUM | 16 | None | TPF2 |
| DATA FIELD 7 | NUMERIC | 48 | None | TPF6 |
| DATA FIELD 8 | ALP-NUM | 24 | None | None |

FIGURE 5

| ITERATION | INPUT | RANGE OF CHARACTERS |
|---|---|---|
| 0 | x | ABCDEFGHIJKLMNOPQRSTUVWXYZ |
| 1 | 0 | ABCDEFGHIJKLMNOP[Q]RSTUVWXYZ |
| 2 | 1 | AB[C]DEFGHIJKLMNOPQ |
| 3 | 1 | [D]EFGHIJKLMNOPQ |
| 4 | 0 | FGH[I]JKLMNOPQ |
| 5 | 0 | FGH[I]J |
| 6 | x | (FGH) |

652 — ITERATION
654 — INPUT
656 — RANGE OF CHARACTERS
658, 660, 662, 664, 666, 668

FIG.6C

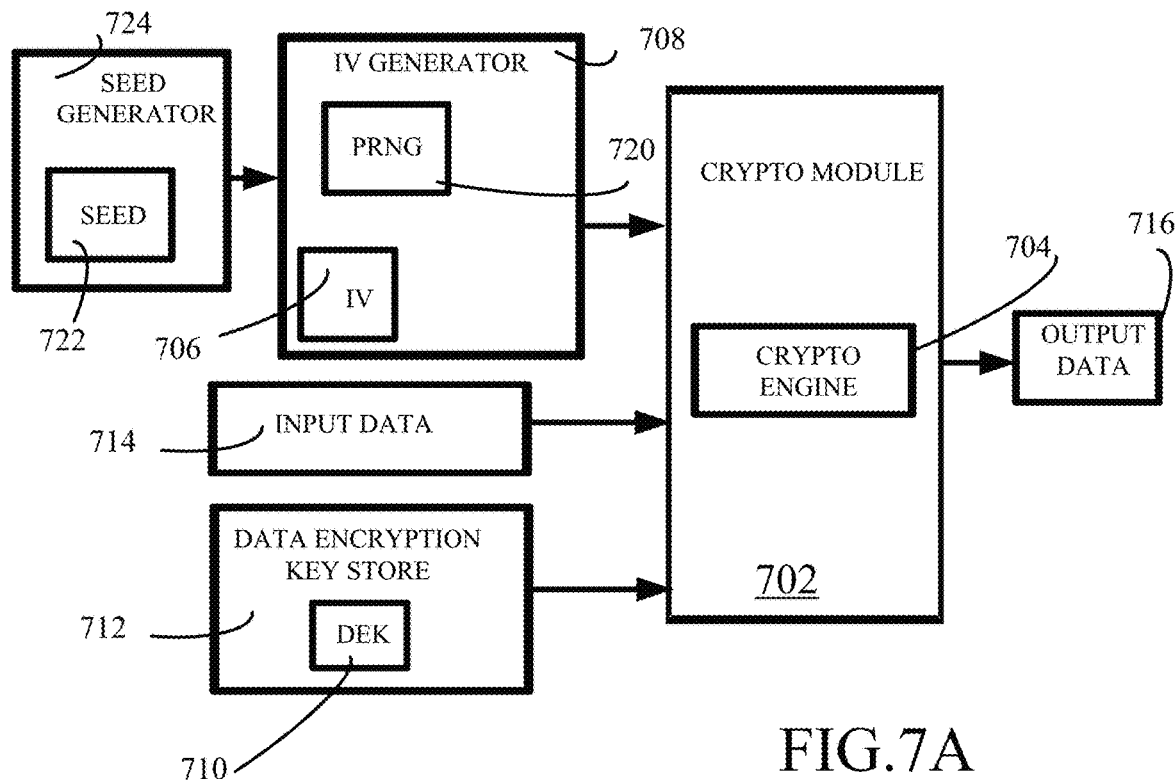
FIG.7A
FIG.7B
FIG.7C

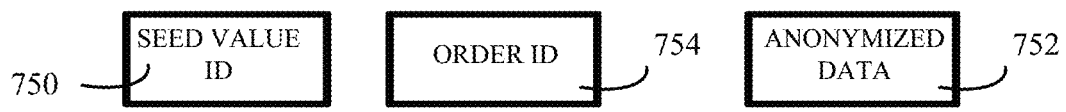
FIG.7D
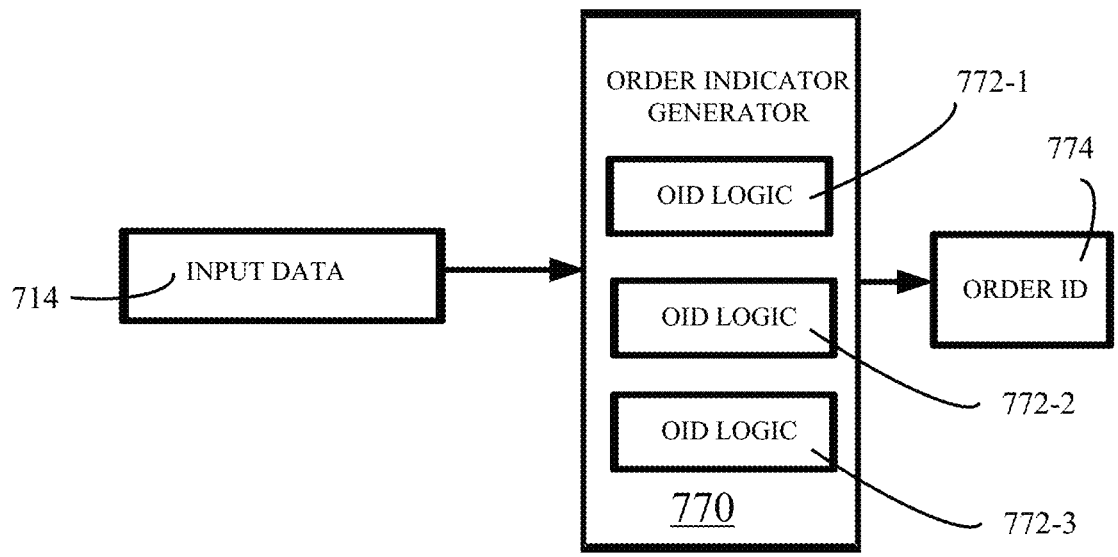
FIG.7E
FIG.7F

|  | 782 | 784 | 786 | 780 |
|---|---|---|---|---|
|  | CLEAR DATA | ANONYMIZED DATA | SEARCH ID FIELD DATA | |
| 788 | abc def | 412132423 | 423 | |
|  | abc ghi | 348291212 | 212 | |
|  | dep kah | 715389542 | 542 | |
|  | ghi lmn | 389152479 | 479 | |
|  | ghi dep | 927154510 | 510 | |
|  | abc def | 451431932 | 932 | |

FIG.7G

|  | 792 | 794 | 790 |
|---|---|---|---|
|  | SEARCH KEY | SEARCH ID | |
| 793-1 | abc | 423, 213, 932 | |
|  | def | 423, 932 | |
| 793-2 | ghi | 213, 479, 510 | |
|  | dep | 542, 510 | |
| 793-3 | kah | 542 | |
|  | lmn | 479 | |

FIG.7H

POST ACTION WITHOUT ANONYMIZATION

CONFIRMATIONTOKEN=D_50pD0Su2DOuFvjle8LLJqm.GsZ_1o9A5xyMTUhEgGRHn1_wLcw1A534jF8R_fsMpDZEiz ZnR.gLnzEuTQW_OcdKSvBVZUvsOPAqV.MzcOg7f8ZXplu6MniAFOb.BVW8kIn.ONoK9MuDte_lnYJAv7kSmg%3D&ca ncelURL=%2F001C000000n6wyJ&id=001C000000n6wyJ&retURL=%2F001C000000n6wyJ&save_new_url=%2F001%2Fe% 3FretURL%3D%252F001C000000n6wyJ&save=Saving...&acc10=&acc2=Test+Account+1&acc3_mod=0&acc3_lspfsub=0&acc17city=&acc18street=&acc17state=&acc18city=&acc17street=&acc18street=&acc17state=&acc18zip= &acc8=&acc6=&acc11=&acc3_lkid=0000000000 00000&acc3_lkold=null&acc3_lspf=001&acc3_lktp=001&acc3_lspfsub=0&acc17city=&acc18street=&acc17state=&acc18city=&acc17zip= 7=&acc8=&acc11=&acc11=&acc3_lkid=0000000000&acc15=&acc 7=&acc8=&acc15=&acc17street=&acc18city=&acc18state=&acc17zip= &acc17country=&sysMod=12da5ed4b20

POST ACTION WITH ANONYMIZATION

CONFIRMATIONTOKEN=D_50pD0Su2DOuFvjle8LLJqm.GsZ_1o9A5xyMTUhEgGRHn1_wLcw1A534jF8R_fsMpDZEizZnR.g LnzEuTQW_OcdKSvBVZUvsOPAqV.MzcOg7f8ZXplu6MniAFOb.BVW8kIn.ONoK9MuDte_lnYJAv7kSmg%3D&cancelURL=% 2F001C000000n6wyJ&id=001C000000n6wyJ&retURL=%2F001C000000n6wyJ&save_new_url=%2F001%2Fe% 3FretURL%3D%252F001C000000n6wyJ&save=Saving...&acc10=&acc2=TPF1Kakgfkoja1TSF+TPF1Bmhaehkddfama1TSF+1 &acc11=&acc3_lkid=0000000000000000&acc3_lkold=null&acc3_lktp=001&acc3_lspf=001&acc3_lspfsub=0&acc3_mod=0&acc3_lspfsub=0&a cc12=&acc6=&acc7=&acc8=&acc20=&acc8=&acc15=&acc17street=&acc18city=&acc18state=&acc17zip=&a cc17zip=&acc17country=&sysMod=12da5ed4b20

GET ACTION RESPONSE FROM HOSTED CLOUD

```
...
<tr class="dataRow even last first">
<th scope="row" class="dataCell">
<a href="/001C000000n6wyJ">TPF1Kakgfkoja1TSF TPF1Bmhaehkddfama1TSF 1</a>
</th>
...
</tr>
...
```
904    906

GET ACTION RESPONSE TO USER COMPUTER

```
...
<tr class="dataRow even last first">
<th scope="row" class="dataCell">
<a href="/001C000000n6wyJ">Test Account 1</a>
</th>
...
</tr>
...
```
908    910

SYSTEM AND METHOD TO ANONYMIZE DATA TRANSMITTED TO A DESTINATION COMPUTING DEVICE

CROSS-REFERENCE TO RELATED APPLICATIONS

This application is a continuation-in-part of application Ser. No. 13/844,509 filed on Mar. 15, 2013, which is a continuation-in-part of a) application Ser. No. 13/042,459 filed on Mar. 8, 2011 and b) application Ser. No. 13/323,821 filed on Dec. 13, 2011. Application Ser. Nos. 13/844,509, 13/042,459 and 13/323,821 are all incorporated herein by reference, in its entirety.

TECHNICAL FIELD

The present invention relates generally to transmitting data to and retrieving data from a destination computing device and particularly, to anonymize data transmitted to the destination computing device and de-anonymize data retrieved from the destination computing device.

DESCRIPTION OF RELATED ART

The Internet has enabled computer users all over the world to interact, communicate, store and access information electronically. One particularly popular mode for running applications over the internet is to host application on a server located in a remote location, along with data associated with the applications. The users of the application access the application and associated data over the internet. Sometimes, this mode of running applications in a remote location is referred to as cloud computing. It is not uncommon for the application to be hosted on a server owned or controlled by a third party. And, various clients or users of the application run the application hosted on the server at the third party location and store data corresponding to the application on a data storage device, for example, a database running on a computing device at the third party location.

There are multiple benefits of using a third party hosted application to a client. For example, the application may be managed by subject matter experts who are familiar with the application, for example a customer relationship management (CRM) application. Sometimes, ancillary applications and resources needed to provide best in class application may be made available to all the clients of the application. The third party may be able to allocate resources based on varying or seasonal demands of each of its customers.

As more and more enterprises or customers use applications hosted at third party locations, the data associated with the enterprise may need to be protected from unauthorized access. Some of the data security requirements may be imposed by regulatory bodies. Some of the data security requirement may be client specific.

As more and more applications are hosted at the third party locations and corresponding data is stored at the third party locations, there is a need to find efficient ways to provide data security to the data stored at the third party locations. With these needs in mind, the current disclosure arises. This brief summary has been provided so that the nature of the disclosure may be understood quickly. A more complete understanding of the disclosure can be obtained by reference to the following detailed description of the various embodiments thereof in connection with the attached drawings.

SUMMARY OF THE INVENTION

In one embodiment, a method for anonymizing data to be transmitted to a destination computing device is disclosed. Data to be transmitted is received from a user computer. The data includes a plurality of characters. An order indicator data indicative of the order of the received data is generated. The data is anonymized using an anonymization module, to derive an anonymized data. The anonymized data and the order indicator data is transmitted to the destination computer over a network.

In yet another embodiment, an anonymization system to anonymize data transmitted to a destination computing device is disclosed. The system includes an anonymization strategy module to store anonymization strategy for data anonymization, a logic to receive data to be transmitted to the destination from a user computer, an order indicator generator to generate an order indicator data indicative of the order of the received data. An anonymization module to anonymize data based on the anonymization strategy to generate an anonymized data. The anonymized data and the order indicator data is transmitted to the destination computing device.

In yet another embodiment, a method for anonymizing data to be transmitted to a destination computing device is disclosed. Data to be transmitted is received from a user computer. The data includes a plurality of characters. The data is anonymized using an anonymization module, to derive an anonymized data. A portion of the anonymized data is selected as a search ID. A cross reference between a search key indicative of a portion of the received data and the corresponding search ID is stored in a data store. The anonymized data is transmitted to the destination computer over a network.

In yet another embodiment, an anonymization system to anonymize data transmitted to a destination computing device is disclosed. The system includes an anonymization strategy module to store anonymization strategy for data anonymization, a logic to receive data to be transmitted to the destination from a user computer. An anonymization module to anonymize data based on the anonymization strategy to generate an anonymized data and select a portion of the anonymized data as a search ID. A cross reference between a search key indicative of a portion of the received data and the corresponding search ID is stored in a data store. The anonymized data is transmitted to the destination computing device over a network.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures:

FIGS. 4 and 4A show an exemplary block diagram of an anonymization system, according to one aspect of the present disclosure;

FIG. 5 shows an exemplary anonymization strategy data table, according to one aspect of the present invention;

FIG. 6C shows an exemplary table 650 showing various iterations of the decoding operation of the searchable encryption system of FIG. 6A, according to one aspect of the present disclosure.

FIG. 7A shows an exemplary crypto module, according to one aspect of the present disclosure;

FIG. 7B shows a table that describes an exemplary relationship between seed value ID, seed value and initialization vector, according to one aspect of the present disclosure;

FIG. 7C shows exemplary data fields for seed value ID and anonymized data, according to one aspect of the present disclosure;

FIG. 7D shows exemplary data fields for seed value ID, order indicator data and anonymized data, according to one aspect of the present disclosure.

FIG. 7E shows an exemplary table showing a portion of the received data, corresponding order indicator data, seed value ID and corresponding anonymized data, according to one aspect of the present disclosure.

FIG. 7F shows an exemplary order indicator generator, according to one aspect of the present disclosure.

FIG. 7G shows an exemplary table showing the received data, corresponding anonymized data and search ID field data, according to one aspect of the present disclosure.

FIG. 7H shows an exemplary table showing search keys and corresponding search IDs, according to one aspect of the present disclosure.

FIGS. 8A-8D shows exemplary anonymization of data transmitted to a destination computing device;

FIGS. 9A-9C shows exemplary de-anonymization of data received from the destination computing device;

DETAILED DESCRIPTION

To facilitate an understanding of the adaptive aspects of the present invention, the general architecture and operation of a networked system is described. The specific architecture and operation of the adaptive aspects of the present disclosure are then described with reference to the general architecture.

Figure 1A:
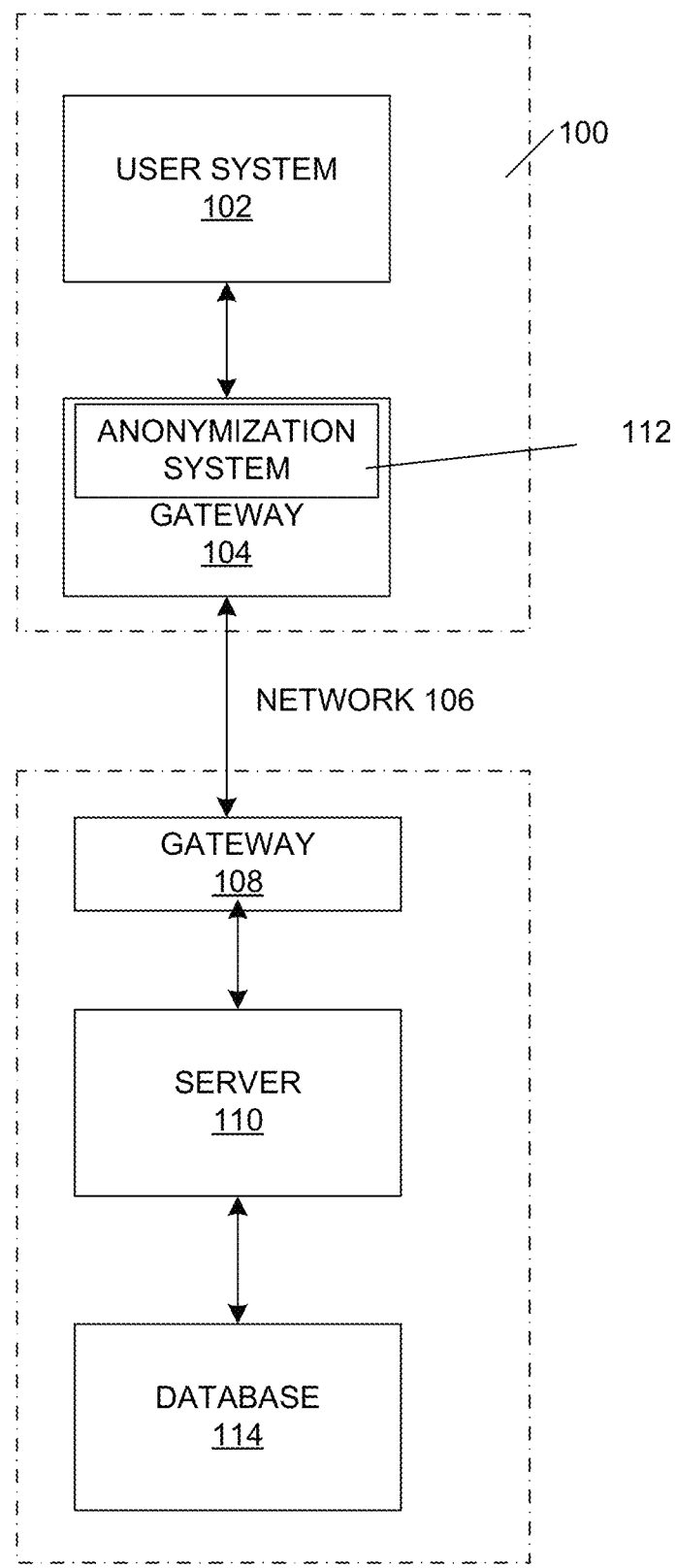
FIG. 1A shows a block diagram of a system with anonymization system of the present disclosure used to process requests from a user system to an application server, according to one aspect of the present disclosure.

FIG. 1A shows a top-level block diagram of a system 100 with anonymization system of this disclosure that is used to send data from a user system, according to one aspect of the present disclosure. System 100 includes a user system 102 that is coupled via a gateway 104 and a network connection 106 to a server 110 through another gateway 108. In one aspect, server 110 is a web-server. Gateway 104 in one embodiment includes an anonymization system 112 of this disclosure. Database 114 is used to store information that is accessed by the user system 102. In one aspect, database 114 is a structured query language (SQL) based database.

Figure 1B:
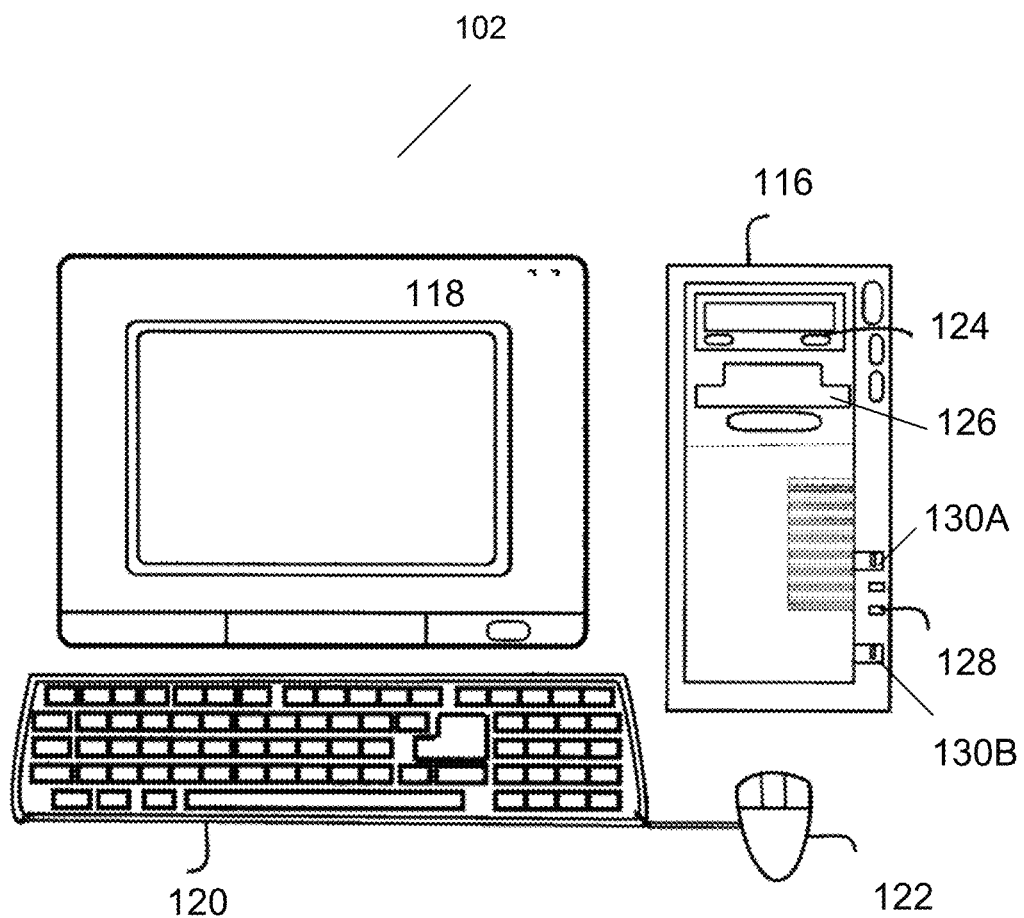
FIG. 1B shows a block diagram of the user system of FIG. 1 configured to communicate with a server over the network, according to one aspect of the present disclosure.

FIG. 1B is a block diagram of a user system 102 according to one embodiment of the present disclosure, which is configured to communicate with the server 110 over the network. FIG. 1B includes a user computer 116 (sometimes referred to as computer 116) and a monitor 118. Monitor 118 may be a CRT type, a LCD type, a plasma type, or any other type of color or monochrome display. Also provided with computer 116 is a keyboard 120 for entering text data and user commands, and a pointing device 122 (such as a mouse) for processing objects displayed on monitor 118. In some embodiments, objects displayed on monitor 118 may be elements of a graphical user interface.

Computer 116 may include a computer-readable memory medium such as a rotating disk 124 for storing readable data. Besides other programs, disk 124 can store application programs including web browsers by which computer 116 connects to a network and the systems described below, according to one aspect of the present disclosure. In some embodiments, disk 124 may be a disk system with a plurality of disk drives arranged as a Redundant Array of Inexpensive Drives (RAID) system, accessible using a storage adapter (not shown).

Computer 116 can also access a computer-readable storage device 126 with removable storage media storing data files, application program files, and computer executable process steps embodying the present invention or the like. For example, the storage device 126 may be a CD-ROM or a DVD ROM. In some embodiments, the storage device 126 may support removable storage media that is read-only device (R), write once-read many (WORM), or rewriteable (RW) type. In some embodiments, the storage device 126 may also be provided with computer 116 to access application program files, audio files and data files stored on a removable storage media. In some embodiments, the removable storage media may be optical, magnetic, magneto-optic, or semiconductor based recording media.

A modem, an integrated services digital network (ISDN) connection, wireless or the like also provides computer 116 with a DSL/Cable/satellite/wireless (or Internet connection) 128 to the World Wide Web (WWW). Internet connection 128 allows computer 116 to send and receive commands, data files, audio files, application program files and computer-executable process steps embodying the present invention.

Computer 116 is also provided with external audio speakers 130A and 130B to assist a listener to listen to music either downloaded on-line from the Internet or off-line using a storage medium. It is noteworthy that a listener may use headphones instead of audio speakers 130A and 130B to listen to music.

Figure 2:
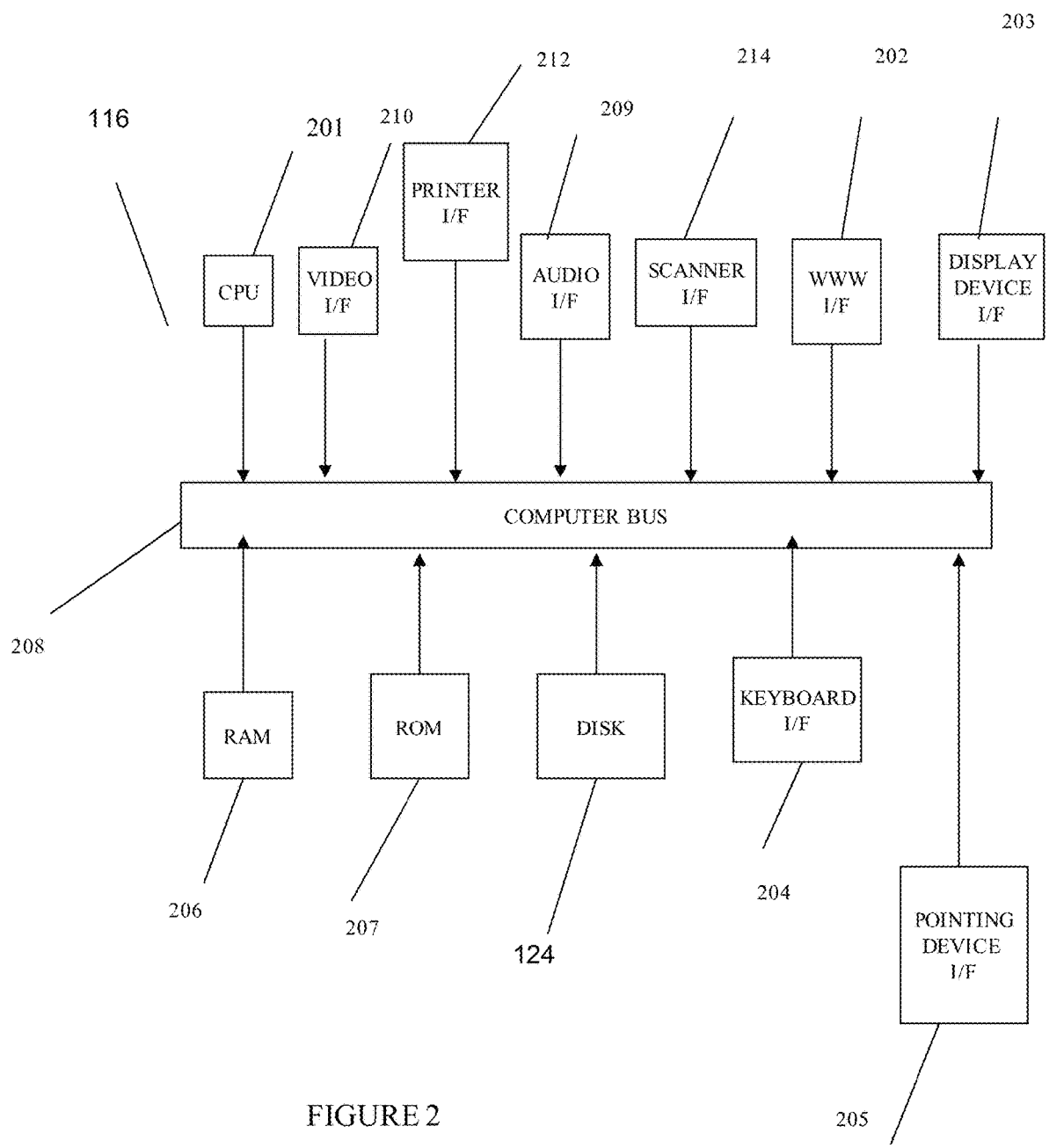
FIG. 2 shows a block diagram of the internal functional architecture of a user computer, according to one aspect of the present disclosure.

FIG. 2 is a block diagram showing the internal functional architecture of computer 116. As shown in FIG. 2, computer 116 includes a central processing unit (CPU) 201 for executing computer-executable process steps and interfaces with a computer bus 208. Also shown in FIG. 2 are a WWW interface 202, a display device interface 203, a keyboard interface 204, a pointing device interface 205, an audio interface 209, video interface 210, printer interface 212, and a disk 124. Audio Interface 209 allows a listener to listen to music, Online (downloaded using the Internet or a private network) or offline (using a CD).

As described above, disk 124 may store operating system program files, application program files, web browsers, and other files. Some of these files are stored on disk 124 using an installation program. For example, CPU 201 executes computer-executable process steps of an installation program so that CPU 201 can properly execute the application program.

A random access main memory ("RAM") 206 also interfaces to computer bus 208 to provide CPU 201 with access to memory storage. When executing stored computer-executable process steps from disk 124 (or other storage device such as storage device 126 or Internet connection 128), CPU 201 stores and executes the process steps out of RAM 206.

Read only memory ("ROM") 207 is provided to store invariant instruction sequences such as start-up instruction sequences or basic input/output operating system (BIOS) sequences for operation of keyboard 120.

Figure 2A:
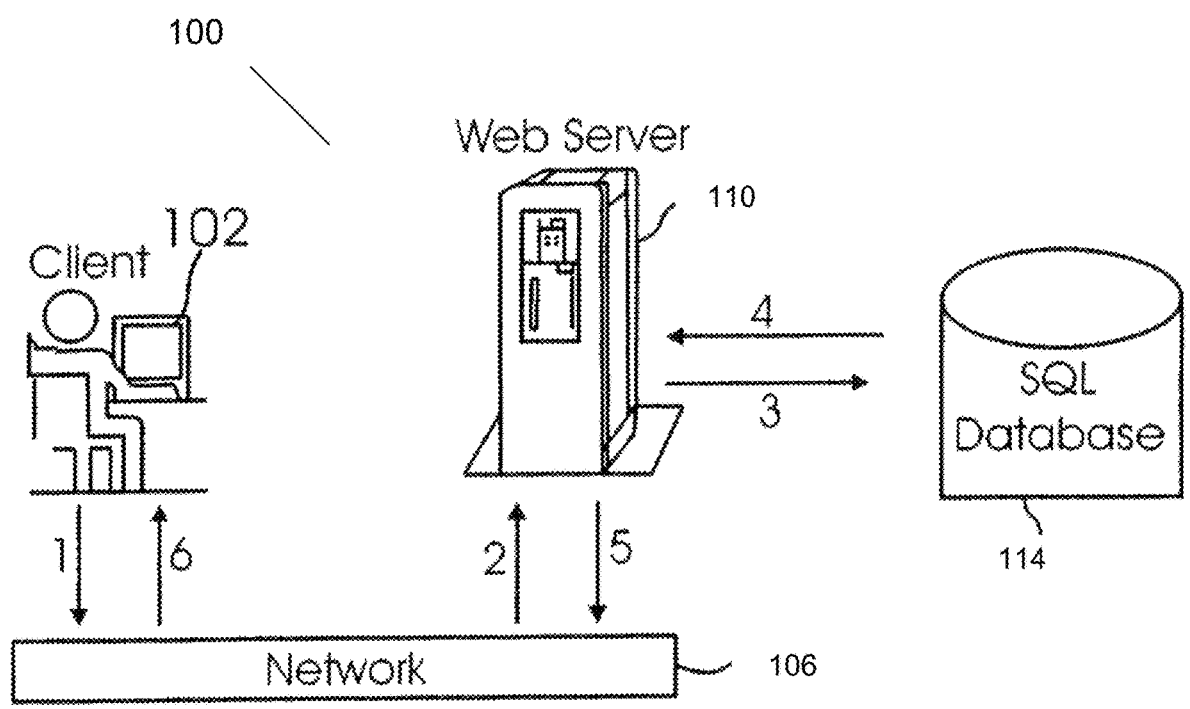
FIG. 2A shows a block diagram of another embodiment of a system used to service requests from a user computer, according to another aspect of the present disclosure.

FIG. 2A shows yet another example of the overall system 100, according to one aspect of the present disclosure. In FIG. 2A, server 110 is shown as a web server and database 114 is shown as a SQL (structured query language) database. FIG. 2A also shows the various steps that are used to access database 114. In step 1, a user using a browser running on the user system 102, submits a URL, as a request. URL includes the application to which the request is directed. In step 2, the web server 110 captures the request, and locates and executes corresponding application specific program (ASP) code for the application to which the request was directed.

In step 3, during execution of ASP code, a structured query language (SQL) code is generated and executed. Based on the executed SQL code, database 114 is accessed to fetch, add, modify or delete information in the database.

In step 4, the results are sent to the web server 110. The web server 110 constructs a response, for example as a HTML code. In step 5, HTML code is sent to the user system 102. In step 6, the HTML page is sent to the browser and displayed on the user system 102.

Although in this example, a user submits a URL as a request, in some embodiments, a user application executing on the user computer 102 may submit a request. The request may be submitted as a URL, and the user application may be configured to receive the response to the request.

Figure 3:
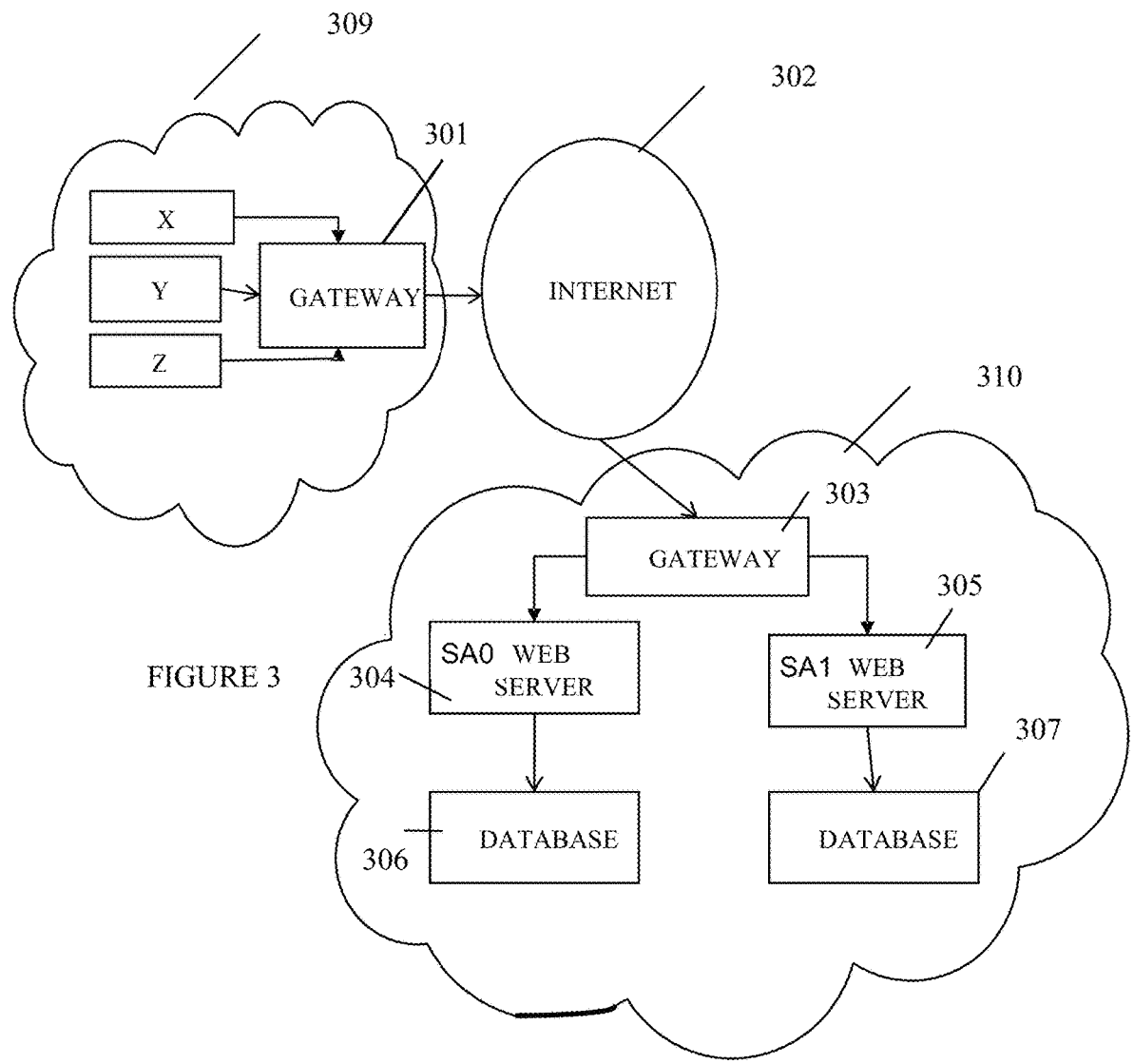
FIG. 3 shows an exemplary topology of computer network coupling user computers to servers over the internet, according to one aspect of the present disclosure.

Now, an exemplary coupling of the computer 116 to a server over the internet will be described with reference to FIG. 3. FIG. 3 shows an exemplary topology of a computer network with computers similar to computer 116, connected to the Internet 302. For illustration purposes, three computers X, Y and Z are shown connected to the Internet 302 via Web interface 202 through a gateway 301, where gateway 301 can interface N number of computers. Gateway 301 may be similar to gateway 104 with an anonymization system 112. Web interface 202 may be a modem, network interface card or a unit for providing connectivity to other computer systems over a network using protocols such as X.25, Ethernet or TCP/IP, or any device that allows, directly or indirectly, computer-to-computer communications. Gateway 301 and computers X, Y and Z may be located or controlled within a user controlled environment. This user controlled environment may be within the user controlled enterprise or intranet. For convenience, gateway 301 and computers X, Y and Z are grouped together and referred to as user cloud 309. Exemplary topology of a computer network may have additional groups of computers with gateway to define additional user clouds. In one embodiment, data flow outside the user cloud may need special handling.

It is noteworthy that the invention is not limited to a particular number of computers. Any number of computers can be connected to the Internet 302 or any other computer network may be used.

FIG. 3 further shows a second gateway 303 that connects a network of web servers 304 and 305 to the Internet 302. Web servers 304 and 305 may be connected with each other over a computer network. Web servers 304 and 305 receive requests from the user computer and respond to the requests received from the user computer. Web server 304 is coupled to a database 306 and web server 305 is coupled to a database 307. In one embodiment, the web server may be hosting an application for use by the user computer. As an example, web server 304 is hosting server application SA0 and web server 305 is hosting server application SA1. As one skilled in the art appreciates, server applications may be a hosted customer relationship management software (CRM) application, a website, online shop, news service, search applications, social networking applications, blog sites, webmail and the like.

In one embodiment, the gateway 303, servers 304 and 305, and databases 306 and 307 may be hosted at a third party location. For convenience, gateway 303, servers 304 and 305, and databases 306 and 307 are grouped together and referred to as hosted cloud 310. Exemplary topology of a computer network may have additional groups of servers with gateways and databases to define additional hosted clouds.

The following provides a brief description of the Internet. The Internet connects thousands of computers world wide through well-known protocols, for example, Transmission Control Protocol (TCP)/Internet Protocol (IP), into a vast network. Information on the Internet is stored world wide as computer files, mostly written in the Hypertext Mark Up Language ("HTML"). Other mark up languages, e.g., Extensible Markup Language ("XML") as published by W3C Consortium, Version 1, Second Edition, October 2000, ©W3C may also be used. The collection of all such publicly available computer files is known as the World Wide Web (WWW). The WWW is a multimedia-enabled hypertext system used for navigating the Internet and is made up of hundreds of thousands of web pages with images and text and video files, which can be displayed on a computer monitor. Each web page can have connections to other pages, which may be located on any computer connected to the Internet.

A typical Internet user uses a client program called a "Web Browser" to connect to the Internet. A web browser is a software program that allows users to access the content stored in Web sites. Modern Web browsers can also create content "on the fly", according to instructions received from a Web site. This concept is commonly referred to as "dynamic page generation". In addition, browsers can commonly send information back to the Web site, thus enabling two-way communication of the user and the Web site. A user can connect to the Internet via a proprietary network, such as America Online, or via an Internet Service Provider, e.g., Earthlink. The web browser may run on any computer connected to the Internet. Currently, various browsers are available of which two prominent browsers are Microsoft Internet Explorer and Mozilla Firefox. The Web Browser receives and sends requests to a web server and acquires information from the WWW. A web server is a program that, upon receipt of a request, sends the requested data to the requesting user. A standard naming convention known as Uniform Resource Locator ("URL") has been adopted to represent hypermedia links and links to network services. Most files or services can be represented with a URL.

URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP).

Web domain is an Internet address that provides connection to a Web server. Generally, URLs have three parts: the first part describes the protocol used to access the content pointed to by the URL, the second contains the directory in which the content is located, and the third contains the file that stores the content: <protocol>:<domain><directory><file>.

For example:
http://www.ciphercloud.com/bios.html
http://www.ciphercloud.com/index.html
http://fn.cnn.com/archives/may2009/pr3.html
ftp://user1.ciphercloud.com/software/pages.zip Commonly, the <protocol> part may be missing. In that case, modern Web browsers access the URL as if the http://prefix was used. In addition, the <file> part may be missing. In that case, one of the convention calls for the file "index.html" to be fetched. In some cases, the request may be redirected to fetch another default file.

For example, the following are legal variations of the previous example URLs:
www.ciphercloud.com/bios.html
www.ciphercloud.com
fn.cnn.com/archives/may2009/pr3.html
ftp://user1.ciphercloud.com/software/pages.zip Web Page.

Web page is the content associated with a URL. In its simplest form, this content is static text, which is stored into a text file indicated by the URL. However, very often, the content contains multi-media elements (e.g. images, audio, video, etc) as well as non-static text or other elements (e.g. news tickers, frames, scripts, streaming graphics, etc). Very often, more than one file forms a Web page. However, there is only one file that is associated with the URL and which initiates or guides the Web page generation.

When a Web browser receives an URL, the Web browser requests a Domain Name System (DNS) name server to decode the domain name and return the IP address for the domain name. The DNS name server returns the IP address of the domain name as stored in the DNS name server to the web browser. Web browser uses the IP address for the domain name and sends a request corresponding to the requested URL that confirms to the HTTP protocol to the IP address. In one embodiment, the request is sent using TCP/IP protocol over the internet.

In one embodiment, the user computer 116 sends requests to the server using HTTP protocol. As previously described with reference to FIG. 2A, the request is processed by the web server and a response is sent to the user computer. In the exemplary topology described with reference to FIG. 3, the request is sent over the internet to the server. In some embodiment, requests may be sent using Hypertext Transfer Protocol Secure (HTTPS) protocol, which is a combination of HTTP protocol with SSL/TLS protocol to provide encrypted communication and secure identification of a network web server.

Figure 4:
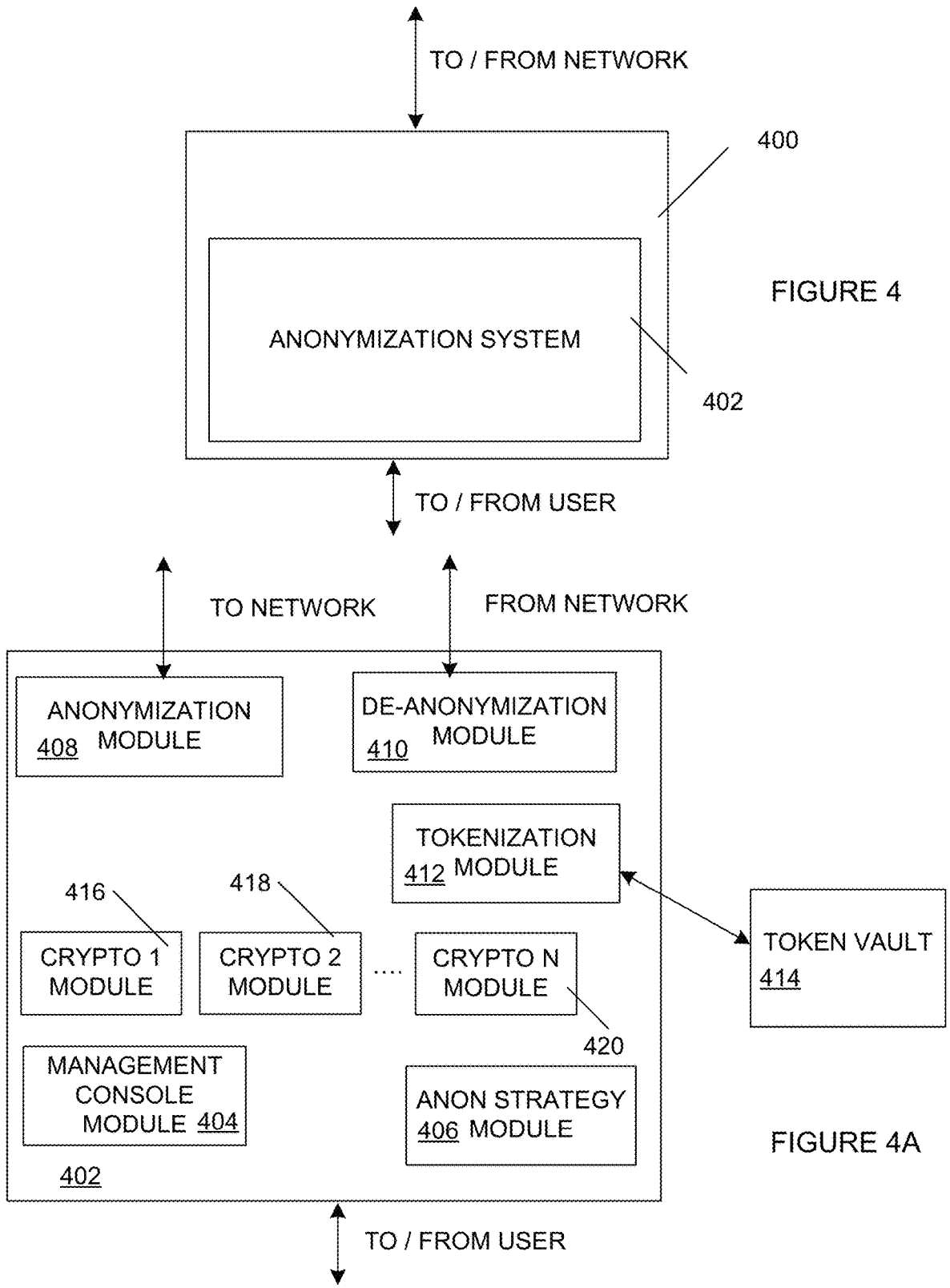

Now, one embodiment of an anonymization system 402 is described with reference to FIG. 4. Anonymization system 402 may be similar to anonymization system 112. FIG. 4 shows the anonymization system 402 as part of gateway 400 that connects to the network, but the anonymization system 402 can be provided in other ways, such as software running on a server, distributed software, or various software and hardware packages operating together. In one embodiment, the anonymization system 402 may be part of the gateway described with reference to FIG. 1A and FIG. 3. The gateway 400 is configured to communicate with the user systems within the user cloud and communicate with the hosted cloud over the network. The anonymization system 402 will be described in detail, with reference to FIG. 4A.

Now referring to FIG. 4A, the anonymization system 402 includes a management console module 404, an anonymization strategy module 406, anonymization module 408, de-anonymization module 410, tokenization module 412 and one or more crypto modules, shown as crypto 1 module 416, crypto 2 module 418 and crypto N module 420. Additionally, a token vault 414 is also part of the anonymization system 402. As one skilled in the art appreciates, various modules referenced in this disclosure may be implemented in hardware, software executed on a computing device or a combination of hardware and software. Additionally, various modules may be implemented as an integrated unit or may be implemented as separate functional units that interact with each other using a communication protocol.

The management console module 404 is configured to communicate with various applications running on the hosted cloud, over the network. Additionally, the management console module 404 is also configured to communicate with the user computer. For example, the management console module 404 may send queries to various applications running on the hosted cloud and receive meta data (or data schema, data definitions) of each application.

The management console module 404 may also present the received meta data information about the applications running on the hosted cloud to the user. The management console module 404 may additionally present the available anonymization strategies for each data field of the meta data to the user computer. The user may select one or more of the anonymization strategies to be applied to various data fields of the application, using the user computer.

The selected anonymization strategy is stored by the management console module 404 in the anonymization strategy module 406, for later use by other modules of the anonymization system 402. The anonymization strategy may be stored as a table in the anonymization strategy module 406. The anonymization strategy in one embodiment may include schema definition for data manipulation. An exemplary selected anonymization strategy will be described later with reference to FIG. 5.

The anonymization module 408 is configured to intercept any data to be transmitted from a user computer to the hosted cloud. The anonymization module 408 is also configured to communicate with the anonymization strategy module 406 and evaluate various fields of data to be transmitted against anonymization strategy stored in the anonymization strategy module 406. Based upon this evaluation, the anonymization module 408 is configured to perform anonymization of one or more data fields using one or more of the tokenization module 412 and crypto modules, for example, crypto1 module 416 and crypto 2 module 418 and generate corresponding anonymized data field.

The anonymization module 408 is also configured to reassemble the data to be transmitted to the hosted cloud, using the anonymized data fields. In one embodiment, the reassembled data includes one or more unique data pattern added to the anonymized data fields to indicate the selected anonymization strategy used to anonymize the data fields. In one embodiment, a preamble is appended to the beginning of the anonymized data field. In one embodiment, a postamble is appended to the end of the anonymized data field. The reassembled data is forwarded to the hosted cloud over the network using the gateway 400. Various functions and features of the tokenization module 412 and crypto modules will be described later.

The de-anonymization module 410 is configured to intercept any data received by the user computer from the hosted cloud. The de-anonymization module 408 is also configured to evaluate various fields of data received from the hosted cloud to detect and decode the preamble and postamble of the data fields. Based upon this evaluation, the de-anonymization module 410 is configured to perform de-anonymization of one or more data fields using one or more of the tokenization module 412 and crypto modules, for example, crypto1 module 416 and crypto 2 module 418 and generate corresponding de-anonymized data field. The de-anonymization module 410 is also configured to reassemble the data to be transmitted to the user computer, using the de-anonymized data fields. The reassembled data is forwarded to the user computer.

Now, referring to FIG. 5, an exemplary anonymization strategy data table 500 for server application SA0 stored by the anonymization strategy module 406 is described. As one skilled in the art appreciates, the anonymization strategy data may be stored in other forms other than a table form. Column 502 shows various data fields of server application SA0. Each of the rows of table 500 shows the data field and their corresponding characteristics. As an example, Column 504 shows data type for each of the data fields, for example numeric, alphabetical or alpha-numeric characters. Column 506 shows the length of the data field. Column 508 shows whether any portion of the data field needs to be retained as originally provided by the user computer. Column 510 shows the selected anonymization strategy for each of the data fields.

Now referring to row 512, various attributes of DATA FIELD 1 is stored in table 500. For example, DATA FIELD 1 is a numeric field of length 10 characters. Characters 8 through 10 of DATA FIELD 1 needs to be retained in its original form. The selected anonymization strategy for DATA FIELD 1 is TPF1. For example, DATA FIELD 1 may be a telephone number and characters 10:08 may represent the area code of the telephone number and may have to be maintained in its original form at the hosted cloud. However, characters 07:01 will be anonymized using anonymization strategy TPF1. In one embodiment, TPF1 may correspond to anonymization using tokenization module 412. In one embodiment, TPF1 may correspond to anonymization using Crypo 1 module 416. In one embodiment, a preamble indicative of TPF1 anonymization strategy may be appended to the anonymized DATA FIELD 1.

Now referring to row 514, various attributes of DATA FIELD 4 is stored in table 500. For example, DATA FIELD 4 is an alphabetic field of length 8 characters. No characters need to be retained in its original form. The selected anonymization strategy for DATA FIELD 4 is TRF4. In one embodiment, TRF4 may correspond to anonymization using crypto 2 module 418. In one embodiment, TRF4 may correspond to anonymization using crypto N module 420. In one embodiment, a preamble indicative of TRF4 anonymization strategy may be appended to the anonymized DATA FIELD 4.

Now referring to row 516, various attributes of DATA FIELD 8 is stored in table 500. For example, DATA FIELD 8 is an alpha-numeric field of length 24 characters. No characters need to be retained in its original form. The selected anonymization strategy for DATA FIELD 8 is none. Based on this selection, no anonymization of DATA FIELD 8 will be performed and the data contained in DATA FIELD 8 will be sent in its original form.

Now various anonymization techniques implemented in various anonymization modules like tokenization module 412 and crypto modules like crypto 1 module, crypto 2 module and the like will be described. The anonymization technique selected for a data field may be based upon multiple factors. One of the factors is level of desired security. One of the other factors is data attribute preservation for the data field. The data attribute preservation refers to retaining capabilities to perform operations on the stored data field in their anonymized form as compared to the stored data in its original or clear form. Some of the operations that may be performed on the stored data field in their anonymized form include sorting in the order of their clear data form (or original data form), searching, searching regardless of the case of the characters, searching using partial string match or wild card match. As one skilled in the art appreciates, as more data attributes are preserved in the stored data form, in some embodiments, it may lead to decreased level of data security. Clear data or original data refers to the data as present in the data field before anonymization.

Anonymization techniques may be broadly divided into two categories. One, a token based anonymization. The token based anonymization may be implemented in the tokenization module 412 and may require local storage of the tokens in the token vault 414. Another technique is to use a symmetric key encryption based anonymization. Symmetric key encryption based anonymization technique may be implemented in one or more of the crypto modules, for example, crypto module 1, crypto module 2 and the like. Now, various anonymization techniques for each of the token based anonymization and symmetric key encryption based techniques will be described.

Token based anonymization techniques:

Random token anonymization: In this technique, for data contained in each data field, a corresponding token is created. The token vault 414 is used to store the relationship between the original or clear data and the corresponding token. The token is sent to the hosted cloud, after prepending a preamble indicative of the type of anonymization performed on the data field. When the data field is retrieved from the hosted cloud, based on the preamble indicative of the type of anonymization performed, the token is used to extract the corresponding clear data stored in the token vault 414. The de-anonymized data is then forwarded to the user computer.

Sortable token anonymization: In this technique, the token vault is organized in a balanced, ordered tree, with each node representing a specific token that corresponds to a specific clear data. For an input data, the tokenization module 412 looks up the tree in the token vault 414 for a node that has not been used for clear data corresponding to the input data and establish a new token that corresponds to the input data. The new token is mapped to the input data. The new token in the selected node maintains the order of the tree. In this way, the token continues to maintain the order that corresponds to the original or clear data. The order may correspond to the position, sequence, or value of the original data. For example, the order may be based on alphabetical sequence, numerical sequence, value of the characters based on an assigned value or value of the characters based on a pre-assigned value, for example, Unicode value. The new token is then sent to the hosted cloud.

Token anonymization that allows case-insensitive search: In one embodiment, for each data, two tokens are generated. One, based on the original or clear form of the data and the other based on all lower cases. In one embodiment, random token anonymization technique is used, as described above. Both of the generated tokens are sent to the hosted cloud, with the token corresponding to all lower case is stored in a hidden field in the application.

When a search request is received for this field from the user computer, for example, as a keyword in clear form, search request is generated by the anonymization system 402, for both the clear form and all lower case. For example, anonymized keywords are generated, one based on the keyword in its original form and another based on keyword with all lower cases. The search request is then sent to the host cloud, with anonymized keyword for both clear form and all lower case. In one embodiment, the search request is sent with an "OR" logic so as to receive search results for both the keywords. Any results of the search received from the host cloud for both the anonymized keyword for clear form and anonymized keyword for all lower case will then be de-anonymized by the de-anonymization module of the anonymization system. The de-anonymized results are then presented to the user computer. As one skilled in the art appreciates, a keyword received in a search request may be full data field, few characters of a data field or few characters with a wild card. Principles described herein will work for all of these cases, as the search request sent to the host cloud will be based on anonymized keyword.

Symmetric Key Encryption Techniques:

AES encryption per word, with hard coded salt: In this technique, the data field values are broken down into words. Each of the word is encrypted using AES encryption using a hard coded salt. This technique will generate same encrypted data for the same input data, for each encryption cycle. The encrypted data is stored in the hosted cloud. A search word for exact match may be issued by the user computer to the hosted cloud. Corresponding encrypted data for the search word is generated by the anonymization system and sent to the hosted cloud. Any hits for exact match is returned to the anonymization system by the hosted cloud. The hits for exact match are then de-anonymized by the de-anonymization module 410 and presented to the user computer.

AES encryption per word, with hard coded salt that allows case-insensitive search: In one embodiment, for each word, two encrypted data words are generated. One, based on the original or clear form of the data word and the other based on all lower case of the data word. In one embodiment, AES encryption with hardcoded salt anonymization technique is used, as described above. Both of the generated anonymized data are sent to the hosted cloud, with the anonymized data corresponding to all lower case is stored in a hidden field in the application. When a search request is received for this field from the user computer, search request is generated by the anonymization system 402, for both the anonymized data words and sent to the host cloud. In one embodiment, the search request is sent with an "OR" logic so as to receive search results for both the encrypted words. Any results of the search received from the host cloud by the anonymization system will then be de-anonymized and presented to the user computer.

Searchable encryption: In this technique, encryption algorithm is designed to encrypt words of text. The encrypted values preserve the properties of sorting and equality of the clear values. As an example, the equality can be either case-sensitive or case-insensitive. As another example, sorting may be either case-sensitive or case-insensitive. In one embodiment, accented characters may be treated as equal characters. i.e. a character "E" and "É" may be treated as equal or same. In one embodiment, accented characters may be treated as adjacent characters, with "É" positioned after "E". Some of these techniques may permit both order preserving property for the anonymized data and case-insensitive search capability. Exemplary searchable encryption to encode words of a text will now be described with reference to FIGS. 6A-6B.

Figure 6A:
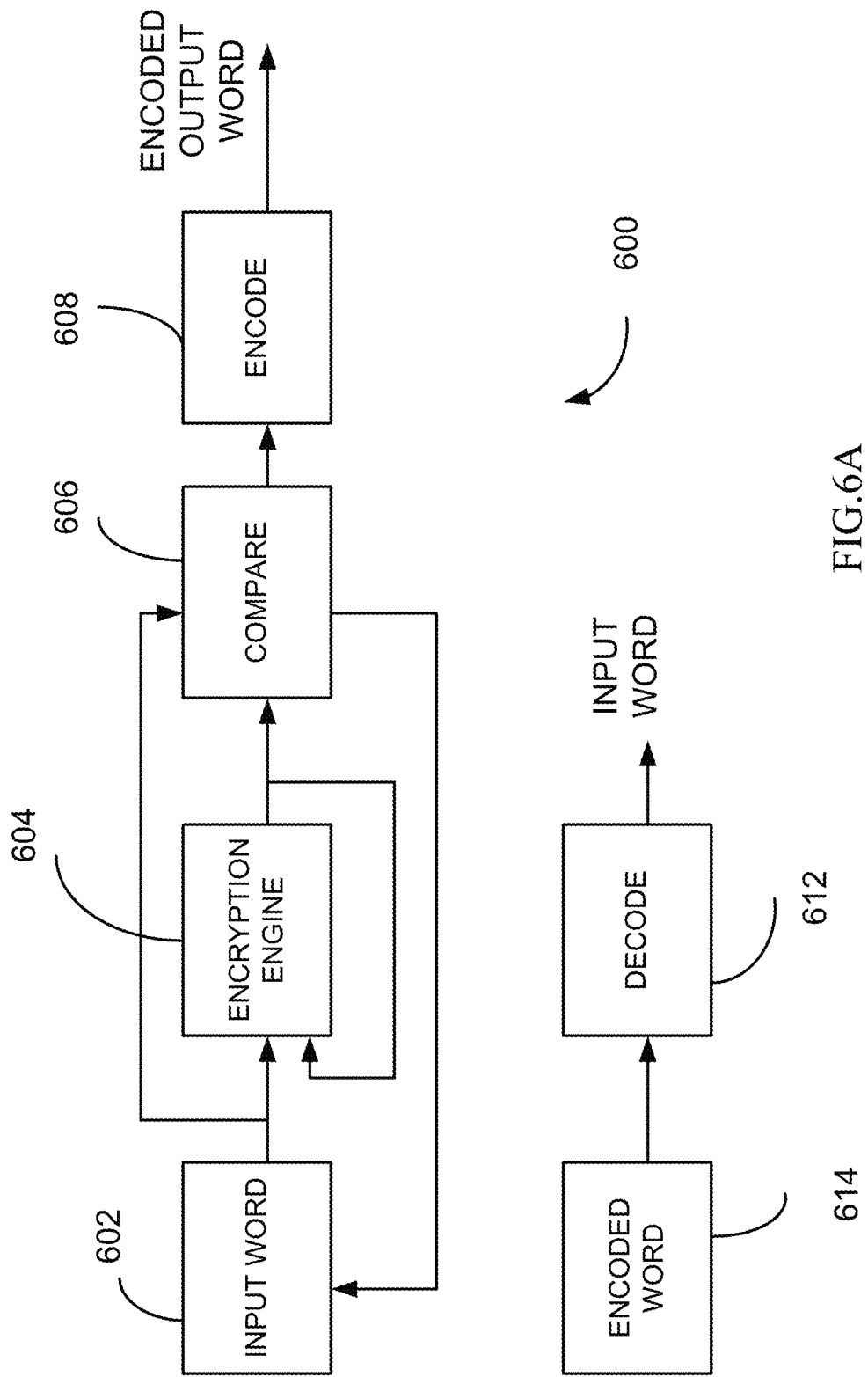
FIG. 6A shows an exemplary block diagram of a searchable encryption system, according to one aspect of the present disclosure.

FIG. 6A shows an exemplary block diagram of a searchable encryption system 600. The searchable encryption system 600 may be implemented in the anonymization system 402. The searchable encryption system 600 includes an input logic 602 to receive input word to be encrypted, an encryption engine 604, a compare logic 606 and an encode logic 608. Various elements of the encryption system 600 may be implemented in various functional modules of the anonymization system 402, for example, in the anonymization module 408, crypto modules 416-418, de-anonymization module 410 and the like. For example, the encryption engine 604 may be part of one of the crypto modules 416-420.

The input logic 602 is configured to receive the input word to be fed to the encryption engine 604. In one embodiment, the encryption engine 604 receives each of the characters of the input word and generate a random character as an output. The encryption engine 604 may include a Pseudo-Random Number Generation Algorithm (PRNG) to generate a random character as an output. The PRNG is preferably secure and is fast. One exemplary PRNG may be a RC4 cipher. In one embodiment, the generated random character will be within a predefined range of characters, which narrows in subsequent iterations, as will be described later.

The output of the encryption engine 604 is fed to the compare logic 606. The compare logic 606 is also configured to receive the corresponding input character as an input. The compare logic 606 is configured to compare generated output character of the encryption engine 604 with the corresponding input character in a first range of characters and generate a binary bit, based on whether the input character is higher in position or lower in position relative to the generated output character. As an example, a bit 0 is generated if the position is lower and a bit 1 is generated, if the position is higher relative to the generated output character. The generated output character is now fed as input to the encryption engine 604 to generate a second generated output character, within a second range of characters.

The second generated output character is again compared with the input character by the compare logic 606 and generate next bit of output based on the position of the input character relative to the second generated output character, within the second range of characters (which is smaller than the first range). The operation is repeated to generate additional output bits until the range is such that there are only two characters before or after the input character. Now, the next character of the input word is processed to generate second set of output bits. This operation will be further described with reference to FIG. 6B with table 620.

Figure 6B:
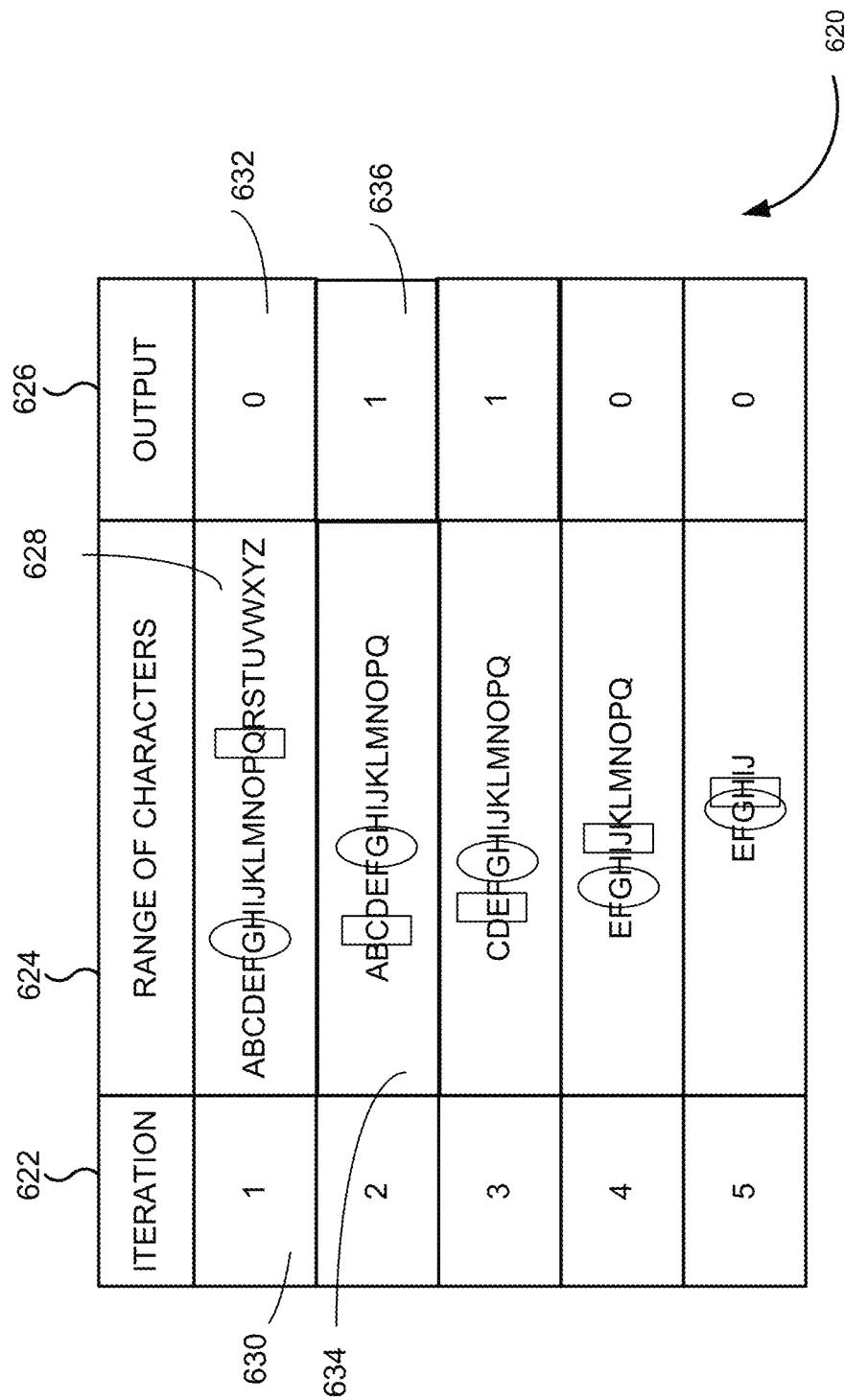
FIG. 6B shows an exemplary table 620 showing various iterations of the encoding operation of the searchable encryption system of FIG. 6A, according to one aspect of the present disclosure.

Referring to FIG. 6B, table 620 shows for each iteration in column 622, the corresponding character range in column 624 and the output of the compare logic for each iteration in column 626. For simplicity, only words with uppercase characters will be described. For example, if the word to be encoded is "GOLD", initial encoding starts with encoding the first character "G". The character G is fed to the encryption logic 604 as a first input character and the encryption logic 604 is configured to generate a random character as an output, for example, a random character between A-Z, which defines the first range of characters. Let us assume, the first generated random character output is Q.

Now, the first input character "G" is compared with the first generated random character output "Q" by the compare logic 606 to see if it is higher in position or lower in position relative to the first generated random character output, within the range shown in cell 628 which corresponds to the first iteration 630. In this case, as character G is lower in position to the first generated random character output Q, a binary value of "0" is output as the first bit of the encoded data, as shown in cell 632. Additionally, the first generated random character output Q defines the upper bound (as character Q is higher in position relative to character G) for the range of characters to be used in the next iteration, for example, second range of characters A-Q.

Next, the first generated random character output (in this case character "Q") is input to the encryption logic 604 and the encryption logic outputs a second generated random character output, within the second range of characters, as shown in cell 634. As one skilled in the art appreciates, the second range of characters is A-Q and the range of characters the encryption logic can output will be configured to be between A-Q. Let us assume, the second generated random character is character "C".

Now, the first input character is again compared with the second generated random character output to see if it is higher in position or lower in position relative to the second generated random character output. In this case, as character G is higher in position to the second generated random character output C, a binary value of "1" is output as the second bit of the encoded data, as shown in cell 636. Additionally, the second generated random character output C defines the lower bound (as character C is lower in position relative to character G) for the range of characters to be used in the next iteration, for example, third range of characters C-Q.

Now, the second generated random character output C is input to the encryption engine 604 and the encryption engine 604 outputs a third generated random character output. In this case, the third range of characters the encryption engine 604 can output is be configured to be within the third range of characters C-Q. Let us assume, the third generated random character is character "E", with a "1" assigned to the third bit of the encoded data, based on the comparison. Additionally, the third generated random character output E defines the lower bound (as character E is lower in position relative to character G) for the range of characters to be used in the next iteration, for example, fourth range of characters E-Q.

Similarly, referring to iteration 4, fourth generated random character is character "J" with an output of "0" as the forth bit of the encoded data, based on the comparison. Additionally, the fourth generated random character output J defines the upper bound (as character J is higher in position relative to character G) for the range of characters to be used in the next iteration, for example, fifth range of characters E-J.

Similarly, referring to iteration 5, the fifth generated random character is character "H", with a "0" assigned to the fifth bit of the encoded data, based on the comparison. This process is repeated until there are two or less characters left before and after the first input character, at which time, the encoding stops. So, in this case, as there are only two characters E and F before and one character J after the first input character G, the encoding stops. So, the final encoded output for character "G" is "00110".

The rest of the characters "O", "L" and "D" are similarly processed to get their corresponding encoded output. As an example, let the final encoded output for "GOLD" is 01001000101001010000110. As one skilled in the art appreciates, depending upon the random character generated by the encryption engine 604, each character may have different number of bits as their encoded output. Now the final encoded output is transformed into a character representation, using an encode logic 608, which will be described now.

In one embodiment, the character representation of the final encoded output is done by splitting the final encoded output into a plurality of bits of data and assigning a unique character to each unique combination of a plurality of bits. As an example, four bits may be used to represent 16 different unique combinations, with each combination assigned a specific character. For example, a base-16 encoding may be used and sixteen characters, characters B-Q assigned to the base-16 encoded data. As an example, 0000 may be encoded as character B and 1111 may be encoded as character Q. With base-16 encoding, other characters may be available for assignment for special purposes or for padding. Other random assignments of characters to the base-16 encoded data are also possible. In some embodiments, dummy characters may be padded in the beginning and the end of the range, so that a lowest character in the character range will not encode as all zeros and highest character in the character range will not encode as all ones.

In one embodiment, in order to provide case insensitive search capability, the encoded output is mapped into lower-case characters, for example, characters b-q. Then, specific characters of the mapped word is capitalized, based on the capitalization of the original input word. For example, if the input word was Mom, and the final output is mapped into character combination "def", then, based on the capitalization of the original input word, the mapped character combination is modified to be "Def". A case sensitive and a case insensitive search on "mom" would return the appropriate results.

In some situations, the final encoded output may result in a mapped word that may have less characters than the original input word. As an example, for a three character input word, the encoded output may only generate two mapped characters. In such a situation, at least one character that is not used in the output mapping (as only 16 characters are used in a base-16 encoding) may be used as a padding character. Preferably, the padding character should sort before all other used characters. As an example, if the characters B-Q are used for mapping, character A may be used as a padding character to be added to the mapped characters. Character A would sort before the characters B-Q.

As an example, if the input of Mom mapped into "De", then with the added padding, the modified mapped characters will be Dea, which will have the same number of characters as the original input character. If the original input was "moM" and the input mapped into "De", then the modified mapped characters will be "deA", which preserves both the number of characters of the original input and the case of the characters of the original input.

In the above examples, only characters A-Z were considered. In order to expand the search and sortable encryption capabilities to characters outside the A-Z range, one or more escape characters may be pre-pended and/or post-pended to the input word. The escape character may indicate the characteristics of the word being encrypted. As an example, unique escape characters may be pre-pended to the input word to indicate if the input word is a character less than the number "0", numbers between 0-9, numbers greater than 9 but less than A, letters A-Z, single byte character greater than "Z", Unicode character in the range U+0080 to U+00FF, Unicode character in the range U+0100 to U+FFFF, Unicode character in the range U+10000 to U+10FFFF and the like. Additionally, a unique escape character may be post-pended to the input word to indicate "end of word".

As one skilled in the art appreciates, in one embodiment, the searchable encryption system 600 may additionally have a decode logic 612 to receive the encoded word 614 and output the decoded word character string. The decode logic 612 would receive the encoded characters of the encoded word as an input, perform the manipulation necessary to decode the encoded characters one character at a time and reassemble the encoded word as a decoded word. An exemplary decoding operation will be further described with reference to FIG. 6C with table 650.

Referring to FIG. 6C, table 650 shows for each iteration in column 652, the input bit 654 from the encoded word, corresponding character range in column 656. For simplicity, only decoding of character "G" of the encoded word will be described. For example, the character "G" was encoded as "00110". Iteration 0 refers to the initial set up of the range of characters, for example, first range of characters 658, which will be from A-Z. In iteration 1, the input bit is "0" and the input bit "0" is fed to the decode logic 612. The decode logic 612 generates first random range character Q as an output, based on the input bit of "0". Since input bit was a "0", character Q defines the upper bound for the next range of characters to be used in the decoding process. Now, the second range of characters 660 is defined to be from A-Q, based on the generated first random range character "Q".

Next, in iteration 2, next input bit of "1" is input to the decode logic 612. The decode logic 612 generates second random range character C as an output, based on the input bit of "1". As the input bit was a "1", character C+1 defines the lower bound for the next range of characters to be used in the decoding process. Now, the third range of characters 662 is defined to be from D-Q, based on the generated second random range character "C".

Next, in iteration 3, next input bit of "1" is input to the decode logic 612. The decode logic 612 generates third random range character E as an output, based on the input bit of "1". As the input bit was a "1", character E+1 defines the lower bound for the next range of characters to be used in the decoding process. Now, the fourth range of characters 664 is defined to be from F-Q, based on the generated third random range character "E".

Next, in iteration 4, next input bit of "0" is input to the decode logic 612. The decode logic 612 generates fourth random range character J as an output, based on the input bit of "0". As the input bit was a "0", character "J" defines the upper bound for the next range of characters to be used in the decoding process. Now, the fifth range of characters 666 is defined to be from F-J, based on the generated fourth random range character "J".

Next, in iteration 5, next input bit of "0" is input to the decode logic 612. The decode logic 612 generates fifth random range character H as an output, based on the input bit of "0". As the input bit was a "0", character "H" defines the upper bound for the next range of characters to be used in the decoding process. Now, the sixth range of characters 668 is defined to be from F-H, based on the generated fifth random range character "H".

Now, the fifth range of characters 668 is narrowed down to three characters, F, G and H. The middle character "G" is chosen as the decoded character for the encoded input word. Similarly, rest of the encoded input words are decoded to generate the original word "GOLD".

Randomizing Anonymization:

As previously discussed, in order to generate the same encrypted data, there is a need to use a fixed hard coded salt. In some embodiments, an initialization vector (IV) is used as part of the encryption scheme. As one skilled in the art appreciates, in some embodiments, the fixed hard coded salt may be similar to an initialization vector.

Now, referring to FIG. 7A, an exemplary crypto module 702 is described. Crypto module 702 may be similar to crypto module 420 of anonymization system 402. The crypto module 702 includes a crypto engine 704 that receives the initialization vector 706 from an initialization vector generator 708. The crypto engine 704 also receives a data encryption key 710 from a data encryption key store 712. The crypto engine is also configured to receive the input data 714. The input data 714 is processed by the crypto engine 704, using the data encryption key 710 and the initialization vector 706 to generate the encrypted output data 716.

The initialization vector generator 708 may include a PRNG function module 720. As previously described, a seed 722 is fed to the PRNG function module. Seed 722 may be generated by a seed generator 724. Based on the value of the seed 722, the PRNG function module 720 generates the initialization vector 706. The Initialization vector generator 708, data encryption key store 712 and seed generator 724 may be part of the anonymization system 402.

Now, as an example, let the input data 714 be "xyz" and the encrypted output data 716 be "abc". For example, the encrypted output data 716 is stored, say in a database. If there is a request to perform a search using the search term "xyz" and retrieve the encrypted output data, the search request sent to the database needs to be modified to include the encrypted output data "abc" as the search term. In order to convert the search term "xyz" to "abc", the search term "xyz" is fed to the crypto engine 704. we also need to use the same initialization vector 706 value and same data encryption key as originally used. This means, we need to use the same seed value for the seed 722 in order to generate the same initialization vector 706 value. As one skilled in the art appreciates, if the same initialization vector 706 value is used on a regular basis, there is a risk of compromising the encryption system. In order to minimize the risk of compromising the encryption system, a plurality of initialization vectors are used in the encryption system, as described below.

In some embodiments, a plurality of known seed values are used to generate a plurality of initialization vectors. For example, referring to FIG. 7B, a table 730 shows the relationship between seed value and corresponding initialization vector. For example, column 732 shows the seed value ID, column 734 shows the corresponding seed value and column 736 shows the corresponding generated initialization vector. As an example, referring to row 740, for the seed value ID of SVID-1, the corresponding seed value is SV-1 and the corresponding generated initialization vector is IV-1. Similarly, referring to row 742, for the seed value ID of SVID-2, the corresponding seed value is SV-2 and the corresponding generated initialization vector is IV-2.

During the anonymization process, the system may selectively use different seed values to generate different initialization vector values. During the deanonymization process, to deanonymize the anonymized data, there is a need to know the initialization vector that was used to anonymize the input data.

In one embodiment, the seed value ID used to generate the initialization vector is stored along with the anonymized data. For example, referring to FIG. 7C, the seed value ID is stored in field 750 and anonymized data is stored in field 752. Seed value ID along with the anonymized data is sent to the destination computing device. As one skilled in the art appreciates, one or more additional fields may also be added to the data sent to the destination computing device. For example, preamble fields and post amble fields may be added.

When the anonymized data is retrieved along with the seed value ID, the seed value ID is used to determine or fetch the corresponding seed value. This seed value is then used to generate the initialization vector, which will have the same value as the initialization vector that was used to encrypt the input data. This generated initialization vector is then used to deanonymize the anonymized data.

When there is a need to send a query to be performed on the stored anonymized data, for example, a search or a sort query, there is a need to modify the query such that any field representing a portion of the original data (or clear text) is modified to include a corresponding encrypted data. As an example, if there is a request to perform a search using a search term "xyz" and retrieve the encrypted output data, the search request sent to the database needs to be modified to include the encrypted output data as the search term. If different seed values are used to generate different initialization vector values, then, based on the value of the initialization vector, the encrypted output data will be different.

For example, for seed value corresponding to SVID-1, for an input data of "xyz", an encrypted output data of "abc" may be generated. And, for a seed value corresponding to SVID-2, for the same input data of "xyz", an encrypted output data of "efg" may be generated. So, in a system where multiple seed values are used, as an example, for a search query containing input data "xyz", all possible combination of corresponding encryption data is generated, using different seed values stored in the system.

For example, if the system had only two seed values, then, using the example above, for a search query for input data "xyz", two possible encrypted data will be generated, namely, "abc", "efg". Then, a modified search query is generated with all the possible encrypted data patterns for input data "xyz". The modified search query is then sent to the database storing the encrypted data, to retrieve the encrypted data corresponding to the plurality of search terms.

The retrieved encrypted data is then decrypted to derive corresponding clear data. Then, the clear data that corresponds to the original query is then sent to the user. As one skilled in the art appreciates, when the clear data is derived from the encrypted data, one or more of the clear data may not correspond to the data requested in the original query, as only one of the plurality of the seed values generated the encrypted data that corresponds to the input data in the query. Those records that do not correspond to the data requested in the original query are just discarded.

As one skilled in the art appreciates, as the number of seed values used to generate the initialization vector is increased, the encryption system is less prone to be compromised. In one embodiment, a plurality of sets of seed values may be provided, with each set of seed values having a different number of seed values. In one embodiment, depending upon the characteristics of the input word, one of the plurality of sets of seed values are selected. For example, if the input word is a frequently occurring word, then a set of seed values having more number of seed values may be selected. In doing so, the initialization vector used to generate the encrypted data will less likely to repeat, thereby minimizing potential compromise of the system.

As an example, let us consider a first set of seed values having eight seed values and a second set of seed values having more number of seed values, for example, sixteen seed values. If the input word is a frequently occurring word like "the", if a seed value from the first set of seed values is used, there will be eight different possible encrypted data patterns for the input word "the". However, if a seed value from the second set of seed values is used, there will be sixteen different possible encrypted data pattern for input word "the". As one skilled in the art appreciates, use of the second set of seed values for a frequently occurring input word will improve the robustness of the encryption system for possible compromise as compared to the use of the first set of seed values.

In one embodiment, the encryption system may maintain a list containing frequently occurring input words. The received input word is compared against this list and if the input word is listed, then a set of seed values having more seed values may be selected. In some embodiments, a threshold value may be set for frequency of occurrence. If the input word has a frequency of occurrence greater than the threshold value, then, a set of seed values having more seed values may be selected. In some embodiments, the data going through the anonymization system may be used to determine a frequency of occurrence for various words. Then, based on a threshold value, appropriate set of seed values may be selected. As one skilled in the art appreciates, the selection of a set of seed values from a plurality of set of seed values may be made based on other criteria including using different tiers of frequency of occurrence of the input word etc.

In some embodiments, it may be desirable to use a large number of initialization vectors, for example, by using a large number of seed values. As previously indicated, to perform functions like search, there is a need to generate corresponding encrypted search key words using all of the initialization vectors. In some embodiments, using large number of initialization vectors may be preferred, for example, to provide increased protection against compromising the encryption system. However, as the number of initialization vector increases, corresponding number of encrypted search key words have to be generated to retrieve corresponding encrypted data. In some embodiments, this may be less preferred, for example, due to increased network traffic.

Now referring to FIG. 7D, exemplary data fields that may be used in yet another embodiment is described. The data fields may include field 750 to store seed value ID used to generate the corresponding anonymized data stored in field 752. In some embodiments, field 754 may be used to store order indicator data that is indicative of the order of the clear data that corresponds to the anonymized data. As an example, each of the clear data "axx", "bxx" and "cxx" would have a corresponding order indicator data whose value will be such that they preserve (or indicate) the order of the clear data "axx", "bxx" and "cxx". For example, if a sort command was issued to manipulate the corresponding anonymized data for "axx", "bxx" and "cxx" in an ascending order, the value of the corresponding order indicator data will be such that the value of the order indicator data for "axx" will be lower than the value of the order indicator data for "bxx", which will be lower than the value of the order indicator data for "cxx". Order indicator data may be sometimes interchangeably referred to as an order ID.

FIG. 7E shows an exemplary table 760, with column 762 showing clear data, column 764 showing corresponding order indicator data for the clear data, column 766 showing the seed value ID and column 768 showing anonymized data that corresponds to the clear data, generated based on the seed value ID. For example, referring to row 769, for clear data "bxx", the corresponding order ID is a binary value of "10", the seed value ID is SVID-2 and corresponding anonymized data is "enl". As one skilled in the art appreciates, in this example, the order ID value for clear data "axx" is a binary value of "01", which is less than the order ID value for clear data "bxx" which is a binary value of "10". Further, the order ID value for clear data "bxx" is less than the order ID value for "cxx", which is a binary value of "11".

As one skilled in the art appreciates, referring back to table 760, the anonymized data that corresponds to the clear data need not have to maintain its order with reference to other anonymized data. For example, the value of clear data "axx" is lower than the value of clear data "bxx". However, the value of the corresponding anonymized data do not maintain the same order. As an example, for clear data "axx", the corresponding value of anonymized data "pkq" is higher than the value of the anonymized data "enl" that corresponds to the clear data "bxx".

The order ID value for the clear data may be generated using one or more order preserving anonymization techniques. Now, referring to FIG. 7F, an exemplary order indicator generator 770 is described. The order indicator generator 770 may be part of the anonymization system 402. The order indicator generator 770 may be configured to generate the order ID 774 for the clear data. For example, input data 714 as clear data is received by the order indicator generator 770. The order indicator generator 770 may have one or more OID logics which may be configured to generate order ID 774 for the clear data using various techniques.

For example, sortable token anonymization as previously discussed may be used to generate a token that is indicative of the order of the clear data. For example, by creating an ordered tree that corresponds to the order of the clear data and assigning a value to each of the nodes. The node value may be designated as a token to indicate the order of the clear data. The generated token is designated as the order ID for the corresponding clear data. As an example, OID logic 772-1 may be configured to generate tokens that are designated as the order ID for the corresponding clear data.

In yet another embodiment, an order preserving hash may be generated by hashing the clear data with an order preserving hash function. The generated hash is designated as the order ID for the corresponding clear data. In some embodiments, the order ID value may be used only for determining the order of the encrypted data. In such embodiments, it may be preferable to use a one-way hash function to generate an order preserving hash that is indicative of the order of the clear data. In this embodiment, as one-way hash function is used, the generated hash which is used as the order indicator data cannot be used to recreate the clear data. As an example, OID logic 772-2 may be configured to generate order preserving hash by hashing the clear data with an order preserving hash function. The generated order preserving hash is designated as the order ID for the corresponding clear data.

In yet another embodiment, one or more of order preserving encryption techniques may be used to generate the order ID for the clear data. As an example, OID logic 772-3 may be configured as a crypto module to generate order preserving encrypted data, based on the clear data and one or more encryption algorithms. The generated encrypted data may be designated as the order ID for the corresponding clear data.

In some embodiments, based on the anonymization technique used, the anonymized data may include more number of characters or bits than the corresponding clear data. This may be sometimes referred to as expansion. When a search request is sent to retrieve corresponding anonymized data, the search key word that corresponds to the anonymized data will also be subject to expansion, thereby resulting in a longer (i.e. more number of bits or characters) search key than the corresponding search key in clear data. In yet another embodiments, as the number of seed values used to generate data encryption key increases, as previously indicated, there is a need to generate corresponding number of anonymized search keys when a search request is sent to retrieve anonymized data that corresponds to the search request. Now, yet another alternate embodiment of anonymization technique will be described, to provide improved search capability of anonymized data.

In one embodiment, a cross reference between the clear data and a portion of the anonymized data is maintained in a data store. FIG. 7G shows an exemplary table 780, with column 782 showing clear data, column 784 showing corresponding generated anonymized data and column 786 showing portion of the anonymized data. For example, referring to row 788, clear data "abcdef" when anonymized, converts to an anonymized data of "412132423". A portion of the anonymized data may be designated as a search ID field. For example, last three characters of the anonymized data may be designated as a search ID field. The data contained in the search ID field may be sometimes referred to as a search ID. Now referring back to row 788, the search ID field of the anonymized data "412132423" has a search ID of "423". The search ID of "423" is cross referenced with the corresponding clear data. Now referring to row 790, clear data "abcdef" when anonymized, converts to an anonymized data of "451431932", which is different than the anonymized data that is shown in row 788. As previously articulated, for same clear data, the corresponding anonymized data may be different, based upon the seed value used during the anonymization. Based on the anonymized data of "451431932", the corresponding search ID will be "932". The search ID of "932" is cross referenced with the corresponding clear data.

Now, referring to FIG. 7H, an exemplary table 790 that may be constructed and stored in a data store, based on the data shown in FIG. 7G is described. The data store may be part of the anonymization system 402. In some embodiments, the data store may be part of the token vault 414. In this example, each clear data is assumed to consist of two portions, with each portion consisting of three letters. For example clear data in row 788 consists of two portions "abc" and "der. Further, it is possible that search requests may be generated for each of the portions independently. In some embodiments, each portion may represent a word. In this example, each portion is referred to as a search key. For example, referring to table 790, column 792 shows various search keys and column 794 shows various corresponding search IDs.

As an example, referring to row 793-1, for search key "abc", the corresponding search IDs are "423", "213" and "952". Now, referring to row 793-2, for search key "ghi", the corresponding search IDs are "213", 479" and "510". Similarly, referring to row 793-3, for search key "kah", the corresponding search ID is "542". As one skilled in the art appreciates, there may be a plurality of search ID for same search key.

When a search request is received with a search term in clear data form, corresponding search key is identified from the search term. Then, one or more search IDs that correspond to the identified search key is retrieved. A search request query is formed using the retrieved search IDs as the keys to search the anonymized data. The retrieved search IDs are compared against data contained in the search ID field of the anonymized data. For example, if the last three characters of the anonymized data is designated as the search ID field, the retrieved search IDs are compared with the last three characters of the anonymized data for a match. All anonymized data with a match are retrieved as part of the response to the search request. The retrieved anonymized data is then de-anonymized to generate corresponding clear data.

For example, in some embodiments, seed value IDs corresponding to each of the anonymized data is used to determine their corresponding data encryption key that was used to anonymize the clear data. In some embodiments, the de-anonymized data is then compared with the search key in clear data form and only those de-anonymized data that match with the search key is returned as a response to the received search request. De-anonymized data that do not match with search key in clear data form may be discarded.

In some embodiments, one or more indicia may be used to identify the search ID field of the anonymized data. For example, one or more special characters may be used as an indicia to indicate the beginning of the search ID field. For example, one or more special characters may be inserted in the anonymized data, prior to the beginning of the search ID field. For example, the indicia to indicate the beginning of the search ID field may be referred to as a search ID field marker. In some embodiments, the search ID field marker may be characters or symbols that may be recognized as word breaks. Some possible characters may be a "space", "semi-colon", "comma" or a "period" etc.

Figure 7J:
FIG. 7J shows an exemplary anonymized data with a search ID indicator and search ID field.

As one skilled in the art appreciates, during de-anonymization of the anonymized data, the characters that correspond to the search ID field marker are ignored or deleted from the retrieved anonymized data. In some embodiments, search ID field marker may be prepended to the search ID so that any match of the search ID with the corresponding anonymized data will occur with anonymized data contained in the search ID field of the anonymized data. FIG. 7J shows an exemplary anonymized data 752 with a search ID field marker 796 and search ID field 798. For example, the data contained in the search ID field 798 may correspond to the search ID field data shown in column 786 of table 780 of FIG. 7F.

Now, referring to FIG. 7H, if the table 790 is corrupted or is not accessible for any reason, the table 790 may be recreated by retrieving the anonymized data from the destination computing device and de-anonymizing the anonymized data to generate corresponding clear data. Search key may be retrieved from the de-anonymized clear data and corresponding search ID may be retrieved from the search ID field of the anonymized data. In some embodiments, capability to recreate table 790 from the anonymized data may be a desirable feature.

As one skilled in the art appreciates, one or more fields of data indicative of the type of anonymization performed and/or containing variables needed to de-anonymize the anonymized data may be transmitted to the destination computing device, along with the anonymized data. One or more of these fields may be used during the de-anonymization of the anonymized data. As an example, the seed value ID is one such variable.

In some embodiments, a check code may be generated using one or more fields of data being transmitted to the destination computing device. The generated check code may also be sent along with anonymized data. The check code may be a checksum or the like. Upon retrieving the anonymized data from the destination computing device, another check code is generated and checked against the received check code to confirm received data is not corrupted or modified and the like.

Figure 8A:
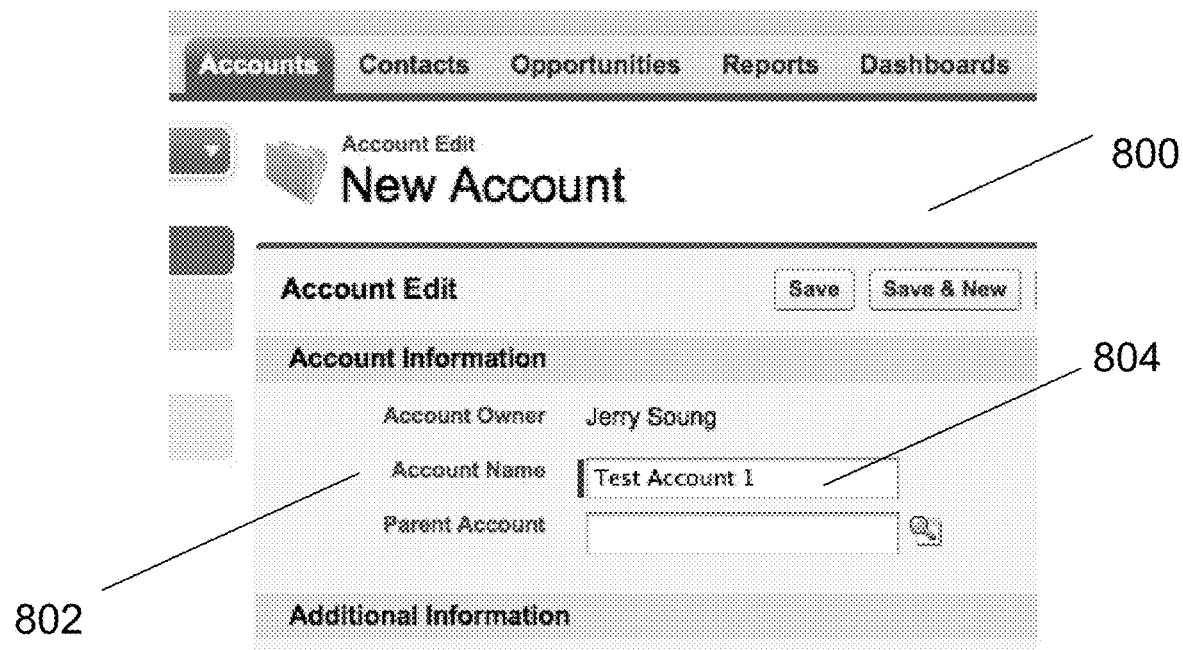

Now referring to FIGS. 8A-8C and FIGS. 9A-9C an exemplary anonymization implementation will be described. Referring to FIG. 8A, a screen shot 800 presented on a user computer to open a new account for an application running on a hosted cloud is shown. More specifically, the data field 802 refers to the Account Name and the corresponding data for the Account Name is entered in the form field 804. For example, the Account Name entered is "Test Account 1".

FIG. 8B shows the "POST" action data as transmitted to the hosted cloud, without anonymization. More specifically, reference numeral 804-1 shows the post data that corresponds to the Account Name. As one skilled in the art appreciates, it is not difficult to ascertain the Account Name as "Test Account 1".

Figures 8D, 9B, 9C:
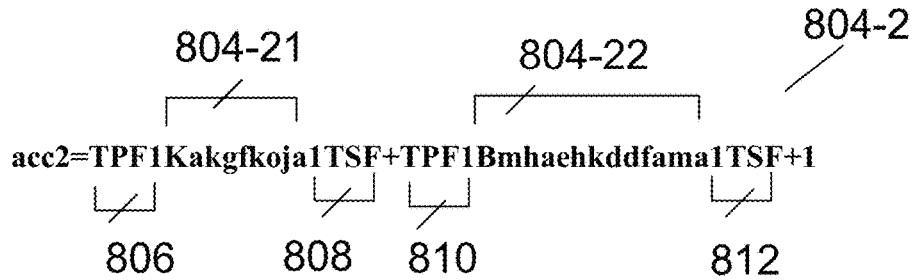

FIG. 8C shows the "POST" data as transmitted to the host cloud, with an embodiment of the anonymization technique described in this disclosure. More specifically, reference numeral 804-2 shows the anonymized data that corresponds to the Account Name. FIG. 8D shows various parts of the anonymized data.

Referring to FIG. 8D, the anonymized data 804-2 includes two anonymized data fields 804-21 and 804-22. The first data field 804-21 corresponds to the word "Test" and the second data field 804-22 corresponds to the word "Account". Additionally, the preamble 806 for the first data field is TPF1. The postamble 808 for the first data field is 1TSF. Similarly, the preamble 810 for the second data field is TPF1 and the postamble 812 for the second data field is 1TSF1.

Figure 9A:

Now, referring to FIG. 9A, a screen shot 900 presented on a user computer to view accounts set up for an application running on a hosted cloud is shown. More specifically, the screen shot 900 shows the list of account names that have been set up, for example, account name 902 referring to Test Account 1 that is received in response to a GET action initiated by the user computer to the application hosted on the hosted cloud.

FIG. 9B shows the HTML code 904 constructed by the application hosted on the hosted cloud in response to the GET action. More specifically, the anonymized values 906 of the account name is returned in the HTML code 904. The anonymized value 906 corresponds to the anonymized data 904-2.

FIG. 9C shows the HTML code 908 constructed after processing the received HTML code 904 from the hosted cloud and de-anonymize the anonymized data field 906. More specifically, the HTML code 908 includes the de-anonymized value as shown in data field 910. The HTML code 908 with de-anonymized value for Account Name data field is sent to the user computer, in response to the GET action initiated by the user computer.

Figure 10:
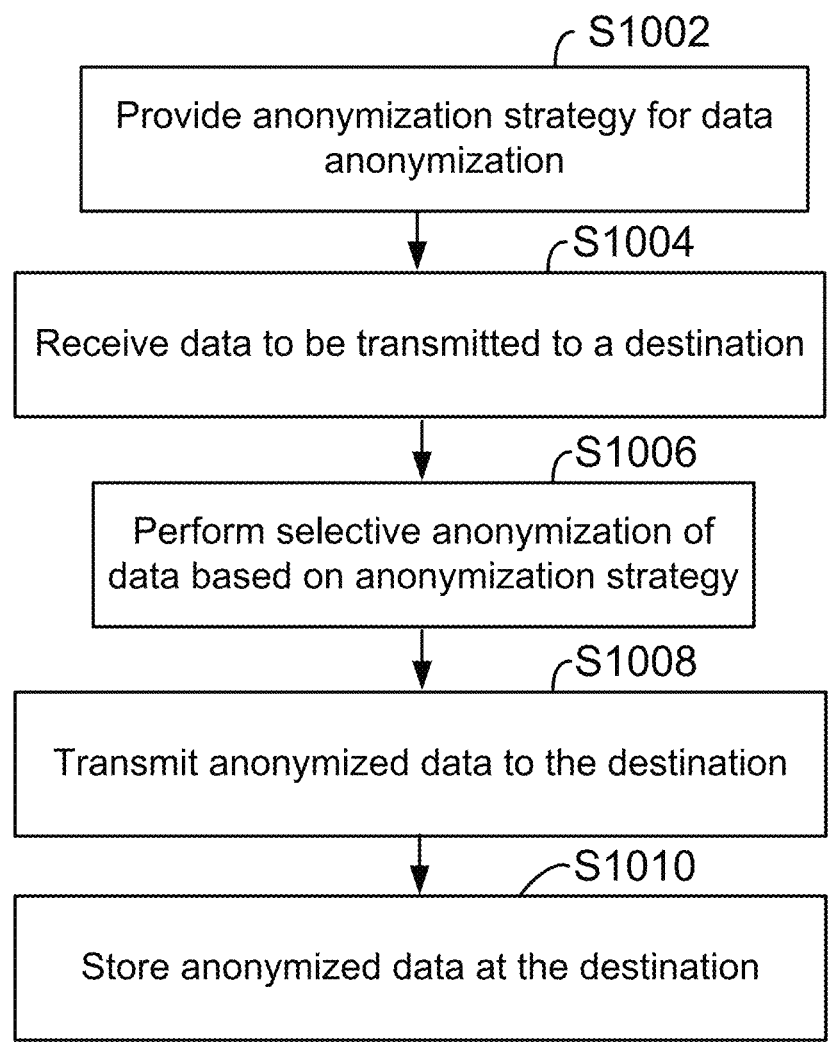
FIG. 10 shows method of anonymizing data to be transmitted to a destination computing, according to one aspect of the present disclosure.

Now, referring to FIG. 10, a method of anonymization of data to be transmitted to a hosted cloud is described. In block S1002, an anonymization strategy for data anonymization is provided. In one embodiment, the anonymization strategy is stored in a anonymization strategy module 406. In one embodiment, a management console module 404 may query applications running on the hosted cloud and present and receive meta data (or data schema, data definitions) of each application. The management console module 404 may present the available anonymization strategies for each data field of the meta data to the user computer. The user may select one or more of the anonymization strategies to be applied to various data fields of the application.

The selected anonymization strategy is stored by the management console module 404 in the anonymization strategy module 406, for later use by other modules of the anonymization system 402. The anonymization strategy may be stored as a table in the anonymization strategy module 406. The anonymization strategy in one embodiment may include schema definition for data manipulation. An exemplary selected anonymization strategy is described with reference to FIG. 5.

In block S1004 data to be transmitted to a destination is received. In one embodiment, the data to be transmitted to a destination is received by the anonymization system from the user computer.

In block S1006, selective anonymization of data based on anonymization strategy is performed. For example, an anonymization strategy may be selected based on the data field and corresponding anonymization strategy, as shown and described with reference to FIG. 5. An exemplary anonymization of data may be performed, as described with reference to FIGS. 8A-8D.

In block S1008, the anonymized data is transmitted to the destination. In one embodiment, the anonymized data is transmitted to the application running on the hosted cloud. An exemplary transmission of anonymized data was at least described with reference to FIGS. 8A-8D.

In block S1010, the anonymized data is stored in the destination. For example, the anonymized data may be stored in a database coupled to an application server, as shown in FIG. 3.

Figure 11A:
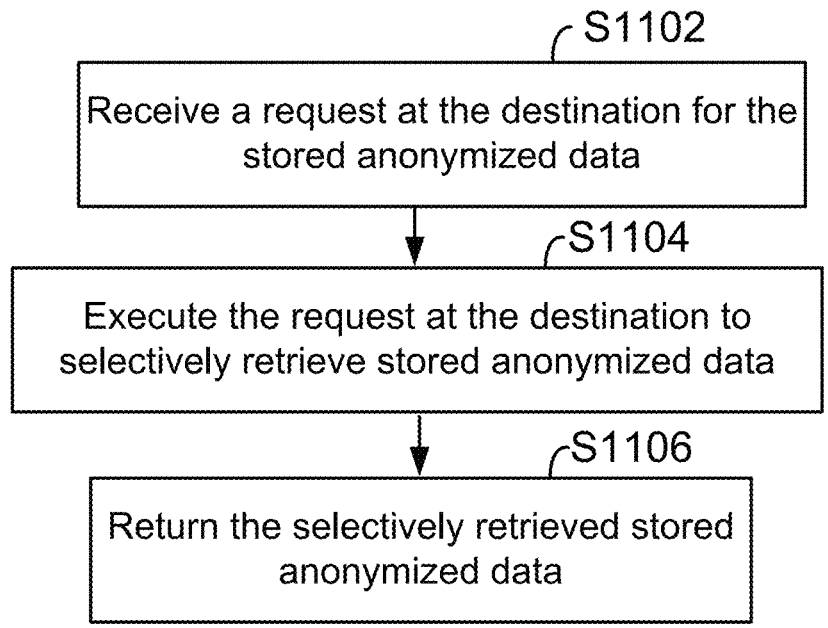
FIG. 11A shows method of processing a request for stored anonymized data by the destination computing device.

Now referring to FIG. 11A, an exemplary method of processing a request at the destination is described. In block S1102, a request for the stored anonymized data is received at the destination. For example, as described with reference to FIGS. 9A-9C, a GET action request is received at the application running on a hosted cloud.

In block S1104, the request is executed at the destination to selectively retrieve stored anonymized data. As an example, the application server running on the hosted cloud processes the GET action and retrieve anonymized data corresponding to the GET action from a user computer.

In block S1106, the selectively retrieved stored anonymized data is returned. As an example, the application running on the hosted cloud assembles a response to the GET action and returns the selectively retrieved stored anonymized data, as shown in FIG. 9B.

Figure 11B:
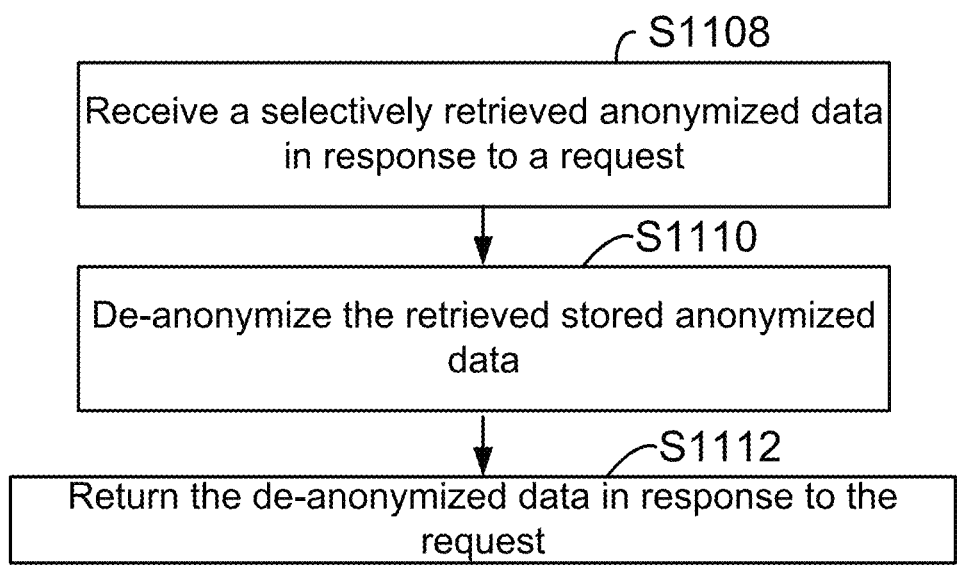
FIG. 11B shows method of processing selectively retrieved anonymized data from the destination computing device.

Now referring to FIG. 11B, an exemplary method or processing a response to a request is described. In block S1108, a selectively retrieved anonymized data is response to a request is received. As an example, a response from the hosted cloud to a GET action is received by the anonymization system 402. The response may be a HTTP response as shown in FIG. 9B.

In block S1110, the retrieved stored anonymized data is de-anonymized. For example, the retrieved anonymized data is evaluated by the de-anonymization module 410. The selective preamble contained in the anonymized data is identified. The de-anonymization module performs the de-anonymization based on the identified preamble and generates the de-anonymized data. An exemplary de-anonymized data is shown in FIG. 9C.

In block S1112, the de-anonymized data is returned in response to the request. For example, an HTTP response as described with reference to FIG. 9C is returned to the user computer.

As it is apparent to one skilled in the art, data transfers from user applications are selectively anonymized using one or more anonymization techniques, based on selected anonymization strategy. The anonymization of data happens transparently to the user application.

Although in some embodiments, anonymization techniques may have be described with reference to encryption of the input word, these techniques may be adapted and practiced using tokenization as well.

Although in this disclosure reference is made to transmitting anonymized data to a hosted cloud or a destination system located at a third party location, the disclosure is not limited to the disclosed embodiments. In some embodiments, anonymized data may be stored in a user cloud itself. The server application may be any type of application, including word processing applications, mail applications and the like.

Although the hosted cloud has been described with one or more servers and databases, these clouds may be implemented with additional servers and databases that may act as redundant systems or cumulative systems.

As one skilled in the art appreciates, various embodiments of this disclosure may provide one or more of the following benefits. For example, anonymization of transmitted data may occur transparent to the user application. Anonymized data may be sortable, based on the selected anonymization strategy. Anonymized data may be searchable, based on the selected anonymization strategy. Anonymized data may be subjected to case-insensitive search, based on the selected anonymization strategy. Portions of a data field may be anonymized, retaining other portion of the data field in its original form. Portions of the data field retained in its original form may be bypassed from the anonymization process and system, which may lead to improved overall performance of the anonymization system.

While embodiments of the present invention are described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for anonymizing data to be transmitted to a destination computing device, comprising:
   receiving data to be transmitted to the destination from a user computer, the data including a plurality of characters defining a clear data in a first base encoding scheme;
   anonymizing the data using an anonymization module to derive an interim anonymized data in a different second base encoding scheme by at least using an initialization vector;
   generating an order indicator data indicative of the order of the received clear data that corresponds to the anonymized data by using one or more order preserving anonymization functions such that the order indicator data preserves the order of the clear data after de-anonymizing the anonymized data using a regenerated initialization vector to derive the clear data; and
   transmitting the order indicator data along with the anonymized data to the destination computing device over a network.

2. The method of claim 1, wherein generating an order indicator data further including:
   providing an order preserving hash function;
   generating a hash value by hashing the received data and the order preserving hash function, wherein the hash value is indicative of the order of the received data; and
   designating the hash value as the order indicator data.

3. The method of claim 1, wherein generating an order indicator data further including:
   generating an order preserving token that corresponds to the received data; and
   designating the order preserving token as the order indicator data.

4. The method of claim 1, wherein generating an order indicator data further including:
   anonymizing the received data using an order preserving anonymization system to generate an anonymized data that is indicative of the order of the received data; and
   designating the generated anonymized data that is indicative of the order of the received data as the order indicator data.

5. The method of claim 1, further including:
   receiving a request to sort the anonymized data stored at the destination computing device; and
   sorting the anonymized data based on the corresponding order indicator data.

6. The method of claim 1, further including:
   selecting a portion of the anonymized data as a search ID;
   storing in a data store, a cross reference between a search key indicative of a portion of the received data and the corresponding search ID.

7. The method of claim 6, further including:
   receiving a request to search the anonymized data stored at the destination computing device, using a search term;
   retrieving search ID that corresponds to the search key matching the search term;
   sending a search request to the destination computing device to retrieve selective anonymized data wherein the search ID matches with the portion of the anonymized data;
   receiving selective anonymized data;
   deanonymizing the received anonymized data; and
   returning the deanonymized data that matches the search term as a response to the search request.

8. The method of claim 6, further including:
   providing a search ID field marker to indicate the beginning of the selected portion of the anonymized data; and
   transmitting the search ID field marker along with the anonymized data to the destination computing device.

9. An anonymization system to anonymize data transmitted to a destination computing device, comprising:
   an anonymization strategy module of the anonymization system executed on a computing device, the anonymization strategy module configured to store anonymization strategy for data anonymization in a memory storage;
   a logic to receive data to be transmitted to the destination computing device from a user computer, wherein the received data including a plurality of characters defining a clear data in a first base encoding scheme;
   an anonymization module to anonymize the data based on an anonymization strategy to derive an interim anonymized data in a different second base encoding scheme by at least using an initialization vector;
   an order indicator generator to generate an order indicator data indicative of the order of the received data that corresponds to the anonymized data by using one or more order preserving anonymization functions such that the order indicator data preserves the order of the clear data after de-anonymizing the anonymized data using a regenerated initialization vector to derive the clear data; and
   transmit the order indicator data along with the anonymized data to the destination computing device over a network.

10. The system of claim 9, wherein the order indicator generator
    receives an order preserving hash function;
    generates a hash value by hashing the received data and an order preserving hash function; and
    designates the generated hash value as the order indicator data for the received data.

11. The system of claim 9, wherein the order indicator generator
    generates an order preserving token that corresponds to the received data; and
    designates the order preserving token as the order indicator data.

12. The system of claim 9, wherein the order indicator generator
    generates an order preserved anonymized data of the received data, wherein the generated order preserved anonymized data preserves the order of the received data; and
    designates the order preserved anonymized data as the order indicator data.

13. The system of claim 9, further including:
    a request to sort the anonymized data stored at the destination computing device is received; and
    the anonymized data is sorted based on the corresponding order indicator data.

14. The system of claim 9, further including:

select a portion of the anonymized data as a search ID;

store in a data store, a cross reference between a search key indicative of a portion of the received data and the corresponding search ID.

15. The system of claim 14, further configured to:

receive a request to search the anonymized data stored at the destination computing device, using a search term;

retrieve search ID that corresponds to the search key matching the search term;

send a search request to the destination computing device to retrieve selective anonymized data wherein the search ID matches with the portion of the anonymized data;

receive selective anonymized data;

deanonymize the received anonymized data; and return the deanonymized data that matches the search term as a response to the search request.

16. The system of claim 14, further configured to:

provide a search ID field marker to indicate the beginning of the selected portion of the anonymized data; and transmit the search ID field marker along with the anonymized data to the destination computing device.

\* \* \* \* \*